(12) United States Patent
Go et al.

(10) Patent No.: US 12,306,438 B2
(45) Date of Patent: May 20, 2025

(54) OPTICAL WAVEGUIDE

(71) Applicant: Nippon Telegraph and Telephone Corporation, Tokyo (JP)

(72) Inventors: Takashi Go, Musashino (JP); Kenya Suzuki, Musashino (JP); Keita Yamaguchi, Musashino (JP); Ai Yanagihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 209 days.

(21) Appl. No.: 17/778,654

(22) PCT Filed: Nov. 26, 2019

(86) PCT No.: PCT/JP2019/046244
§ 371 (c)(1),
(2) Date: May 20, 2022

(87) PCT Pub. No.: WO2021/106091
PCT Pub. Date: Jun. 3, 2021

(65) Prior Publication Data
US 2022/0413218 A1  Dec. 29, 2022

(51) Int. Cl.
*G02B 6/122* (2006.01)
*G02B 6/125* (2006.01)

(52) U.S. Cl.
CPC ........... *G02B 6/1228* (2013.01); *G02B 6/125* (2013.01)

(58) Field of Classification Search
CPC  G02B 6/12119; G02B 6/125; G02B 6/12152; G02B 6/12195; G02B 6/1228;
(Continued)

(56) References Cited

U.S. PATENT DOCUMENTS 5,243,672 A * 9/1993 Dragone .............. G02B 6/2804
                                                      385/39
5,805,751 A * 9/1998 Kewitsch ........... G02B 6/02138
                                                      385/48
(Continued)

FOREIGN PATENT DOCUMENTS

DE    3804330 A1 * 8/1989 ............. G02B 6/125
GB   905689 A  * 9/1962
(Continued)

OTHER PUBLICATIONS

Machine translation of JP H04213407 A. (Year: 1992).*
(Continued)

*Primary Examiner* — Daniel Petkovsek
*Assistant Examiner* — Emma R. Oxford
(74) *Attorney, Agent, or Firm* — Workman Nydegger

(57) ABSTRACT

A waveguide bend which has low loss while keeping the curvature radius small in a waveguide with a given A is realized. An optical waveguide has a straight waveguide and a waveguide bend connected to each other, and tapered waveguide bends inserted between the straight waveguide and the waveguide bend, a curvature radius of the tapered waveguide bend being equal to a curvature radius of the waveguide bend, a waveguide width of the tapered waveguide bend changing continuously from the waveguide width of the straight waveguide at the connection point to the waveguide width of the waveguide bend. A waveguide width of the waveguide bend is larger than a waveguide width of the straight waveguide at a connection point and the tapered waveguide bend and the straight waveguide are connected with an optical axis of the tapered waveguide bend and an optical axis of the straight waveguide being offset.

8 Claims, 14 Drawing Sheets

(58) Field of Classification Search
CPC .... G02B 6/12–126; G02B 2006/12035–12097
See application file for complete search history.

(56) References Cited

U.S. PATENT DOCUMENTS

| | | | | |
|---|---|---|---|---|
| 7,333,691 | B1* | 2/2008 | Gill | G02B 6/1223 359/344 |
| 7,881,575 | B2* | 2/2011 | Mekis | G02B 6/12004 385/28 |
| 12,092,870 | B2* | 9/2024 | Go | G02B 6/125 |
| 2002/0076188 | A1* | 6/2002 | Kimerling | G02B 6/12 385/132 |
| 2002/0122630 | A1 | 9/2002 | Bona et al. | |
| 2003/0156813 | A1* | 8/2003 | Terakawa | G02F 1/3137 385/129 |
| 2004/0184755 | A1 | 9/2004 | Sugiyama et al. | |
| 2004/0234199 | A1* | 11/2004 | Melloni | G02B 6/125 385/32 |
| 2005/0058399 | A1* | 3/2005 | Nishizawa | G02B 6/4214 385/39 |
| 2010/0158443 | A1* | 6/2010 | Jeong | G02B 6/14 29/829 |
| 2016/0306117 | A1* | 10/2016 | Middlebrook | G02B 1/045 |
| 2016/0377807 | A1* | 12/2016 | Ma | G02B 6/122 385/11 |

FOREIGN PATENT DOCUMENTS

| | | | | |
|---|---|---|---|---|
| JP | H04213407 | A * | 8/1992 | |
| JP | 08036114 | A * | 2/1996 | G02B 6/125 |
| JP | H11-248949 | A | 9/1999 | |
| JP | 2001-512846 | A | 8/2001 | |
| JP | 2003279768 | A * | 10/2003 | G02B 6/125 |
| JP | 2004-287093 | A | 10/2004 | |
| JP | 3883118 | A | 11/2006 | |
| JP | 4202212 | A | 10/2008 | |
| WO | WO-02099484 | A2 * | 12/2002 | G02B 6/125 |
| WO | WO-2015096070 | A1 * | 7/2015 | G02B 6/14 |

OTHER PUBLICATIONS

Machine translation of Abstract of JP-08036114-A. (Year: 1996).*
Machine translation of JP-2003279768-A. (Year: 2003).*
I. Papakonstantinou, D. R. Selviah and K. Wang, "Insertion Loss and Misalignment Tolerance in Multimode Tapered Waveguide Bends," in IEEE Photonics Technology Letters, vol. 20, No. 12, pp. 1000-1002, Jun. 15, 2008, doi: 0.1109/LPT.2008.923744. (Year: 2008).*
T. Kitoh, N. Takato, M. Yasu and M. Kawachi, "Bending loss reduction in silica-based waveguides by using lateral offsets," in Journal of Lightwave Technology, vol. 13, No. 4, pp. 555-562, Apr. 1995, doi: 10.1109/50.372465. (Year: 1995).*
Machine translation of DE 3804330 A1. (Year: 1989).*
A. Panda, P. Sarkar, and G. Palai. "Studies on coupling of optical power in fiber to semiconductor waveguide at wavelength 1550 nm for photonics integrated circuits," in Optik, vol. 157, pp. 944-950, doi:10.1016/j.ijleo.2017.11.119 (Year: 2018).*
Machine translation into English of WO 2015096070 A1, 11 pages. (Year: 2015).*
Akira Himeno et al., *Silica-Based Planar Lightwave Circuits*, IEEE Journal of Selected Topics in Quantum Electronics, vol. 4, No. 6, Nov./Dec. 1998, pp. 913-924.
Takashi Goh et al., *Low Loss and High Extinction Ratio Strictly Nonblocking 16×16 Thermooptic Matrix Switch on 6-in Wafer Using Silica-Based Planar Lightwave Circuit Technology*, Journal of Lightwave Technology, vol. 19, No. 3, Mar. 2001, pp. 371-379.
Francois Ladouceur et al., A New General Approach to Optical Waveguide Path Design, Journal of Lightwave Technology, vol. 13, No. 3, Mar. 1995, pp. 481-492.

* cited by examiner

OPTICAL WAVEGUIDE

TECHNICAL FIELD

The present invention relates to an optical waveguide, and more particularly to an optical waveguide that enables construction of a compact optical circuit with a low optical loss.

BACKGROUND ART

As compared with an optical circuit of a free space optical type in which bulky optical components such as lenses and prisms are assembled, an optical circuit of a waveguide optical type which uses optical waveguides formed on a substrate is characterized by a smaller size, better integration, and higher long-term stability/reliability and is widely used in actual systems such as optical communication devices. For example, a wavelength multiplexer/demultiplexer composed of a large number of waveguides arranged in an array, which is called an array waveguide grating, or an optical switch composed of a Mach-Zehnder interferometer with a variable phase shifter has been put into practical use as an optical circuit using Silica-based waveguides (see, for example, NPL 1 and 2). An optical modulator, a demodulation circuit, or the like has been put into practical use as an optical circuit using waveguides made of a dielectric material such as lithium niobate or a semiconductor material such as indium phosphide or silicon.

Waveguide Bend

The performance of such an optical circuit is represented by various indicators and the insertion loss characteristics are one of the most important indicators. The insertion loss of an optical circuit can be classified into three types: fiber connection loss, propagation loss, and circuit excess loss. The fiber connection loss is a loss caused by the difference between the field distribution of propagating light in an optical fiber and the field distribution in a waveguide of the optical circuit. The propagation loss is a loss due to light absorption by the material of the waveguide itself, refraction fluctuations of the waveguide, and light scattering caused by roughness of the core surface. The circuit excess loss is a loss caused by the circuit structure and includes a radiation loss due to a waveguide bend (a bend radiation loss), a loss caused by a slight difference between the field distributions of a waveguide bend and a straight waveguide at the connection portion therebetween (a different-curvature waveguide connection loss), and the like.

In a large-scale circuit such as a matrix optical switch using Silica-based waveguides, the contribution of fiber connection loss is relatively small. The circuit excess loss becomes the dominant loss factor because the propagation loss of the Silica-based waveguides is as small as 1 dB/m or less. In a large-scale optical switch, a large number of optical switch elements, each composed of a Mach-Zehnder interferometer with a variable phase shifter, are integrated and a large number of waveguide bends are used. Thus, even if the bend radiation loss and the different-curvature waveguide connection loss of each waveguide are small, the total circuit excess loss is not negligible.

Because the bend radiation loss of a waveguide increases as the curvature radius of the waveguide decreases, the minimum allowable curvature radius is roughly determined by the relative refractive index difference A between the core and cladding of the waveguide used. For example, a waveguide bend having a curvature radius of 1 mm is used as a waveguide with a Δ of about 2%.

Offset connection in which a waveguide is connected with the waveguide center position being offset at the connection point to correct the positional deviation of the field distribution or clothoid connection in which a straight waveguide and a waveguide bend are connected via a waveguide whose curvature gradually changes is used to reduce the different-curvature waveguide connection loss (see PTL 1).

Directional Coupler

A directional coupler is one of the basic circuit elements that make up an optical circuit. The directional coupler includes two waveguides arranged in parallel and close to each other and a total of four S-bend waveguides connected to the two waveguides at front and rear ends thereof. In the two waveguides arranged close to each other, the field distributions of light propagating through the waveguides overlap each other, such that optical coupling occurs and light in one of the waveguides gradually transits to the other waveguide as it propagates. Any transition rate (coupling rate) of 0 to 100% can be obtained by appropriately selecting the lengths (coupling lengths) of the two waveguides.

Because the speed of transition of light as it propagates increases as the overlap of the field distributions increases, the interval between the two waveguides arranged close to each other is narrowed or the widths of the two waveguides are narrowed in order to obtain a desired coupling rate with a short coupling length. A method of gradually narrowing the waveguide width at the S-bend portion described above in order to make the width of the two waveguides narrower than that of normal waveguides is known (see PTL 2).

As described above, the insertion loss characteristics are important characteristics, and especially in a large-scale circuit such as a matrix optical switch, the loss increases due to accumulation of the circuit excess loss and thus suppression of the circuit excess loss is strongly required. In a large-scale circuit, the area of the optical circuit increases as the scale of integration increases and thus it is also an important issue to keep the chip size small. However, there is a trade-off between the bend radiation loss and the minimum allowable curvature radius as described above. There are problems that, if the curvature radius is reduced to decrease the circuit area, the bend radiation loss becomes large, and if a sufficient curvature radius is secured to reduce the bend radiation loss, the circuit area increases. As is well known, if a waveguide having a large relative refractive index difference $\Delta$ is used, the allowable curvature radius becomes smaller, but the difference between the field distribution size of the waveguide and the field distribution size of the optical fiber ($\Delta \approx 0.3\%$) becomes large, such that the fiber connection loss becomes large. Thus, it is not possible to arbitrarily reduce A.

CITATION LIST

Non Patent Literature

NPL 1: Akira Himeno, et al., "Silica-based planar lightwave circuits," IEEE Journal of Selected Topics in Quantum Electronics, vol. 4, No. 6, pp. 913-924, November/December 1998.

NPL 2: Takashi Goh, et al., "Low loss and high extinction ratio strictly non-blocking 16×16 thermooptic matrix switch on 6-in wafer using silica-based planar lightwave circuit technology," IEEE Journal of Lightwave Technology, vol. 19, No. 3, pp. 371-379, March 2001.

Patent Literature

PTL 1: Japanese Patent No. 4202212
PTL 2: Japanese Patent No. 3883118

SUMMARY OF THE INVENTION

It is an object of the present invention to realize a waveguide bend that has low loss while keeping the curvature radius small in a waveguide with a given Δ. Thereby, an optical circuit in which the circuit excess loss is reduced while suppressing increase in the circuit area is provided. It is another object to provide a short waveguide configuration which reduces the waveguide connection loss extremely when connecting waveguides having different waveguide widths and curvatures.

An embodiment of an optical waveguide according to the present invention to achieve the object is an optical waveguide having a straight waveguide and a waveguide bend connected to each other, wherein a waveguide width of the waveguide bend is larger than a waveguide width of the straight waveguide at a connection point, the optical waveguide includes a tapered waveguide bend inserted between the straight waveguide and the waveguide bend, a curvature radius of the tapered waveguide bend being equal to a curvature radius of the waveguide bend, a waveguide width of the tapered waveguide bend changing continuously from the waveguide width of the straight waveguide at the connection point to the waveguide width of the waveguide bend, and the tapered waveguide bend and the straight waveguide are connected with an optical axis of the tapered waveguide bend and an optical axis of the straight waveguide being offset such that a square of an absolute value of an overlap integral of a normalized electric field distribution of a fundamental propagation mode of the tapered waveguide bend and a normalized electric field distribution of the fundamental propagation mode of the straight waveguide at a connection point between the tapered waveguide bend and the straight waveguide is maximized.

According to this embodiment, by individually optimizing the waveguide width of the straight waveguide at the connection point and the waveguide width of the waveguide bend, it is possible to realize a waveguide bend which has low loss while keeping the curvature radius small and to provide an optical circuit that has excellent loss characteristics while keeping the circuit area small. It is also possible to provide a short waveguide configuration which extremely reduces the waveguide connection loss when connecting waveguides having different waveguide widths and curvatures.

DESCRIPTION OF EMBODIMENTS

Hereinafter, embodiments of the present invention will be described in detail with reference to the drawings. In the embodiments, examples of Silica waveguides will be shown, but materials are not particularly specified in the configurations of optical waveguides of the present invention. Without being limited to Silica-based waveguides, other material-based waveguides such as silicon (Si) waveguides, indium phosphide (InP)-based waveguides, and polymer-based waveguides can be used. Of course, there are no restrictions on the method of manufacturing waveguides. While waveguides with a relative refractive index difference Δ=about 2% and a core height=about 4 µm will be described as a specific design example, the present invention is not limited to the basic parameters of these waveguides and the same idea can be applied with other parameters.

Optimization of Waveguide Width

First, the relationship between a waveguide width and a bend radiation loss will be described. The bend radiation loss in a waveguide bend is due to the propagation velocity of the electromagnetic field in the cladding on the outside of the waveguide bend exceeding a propagation velocity determined by the refractive index of the cladding as is well known.

Figure 1:
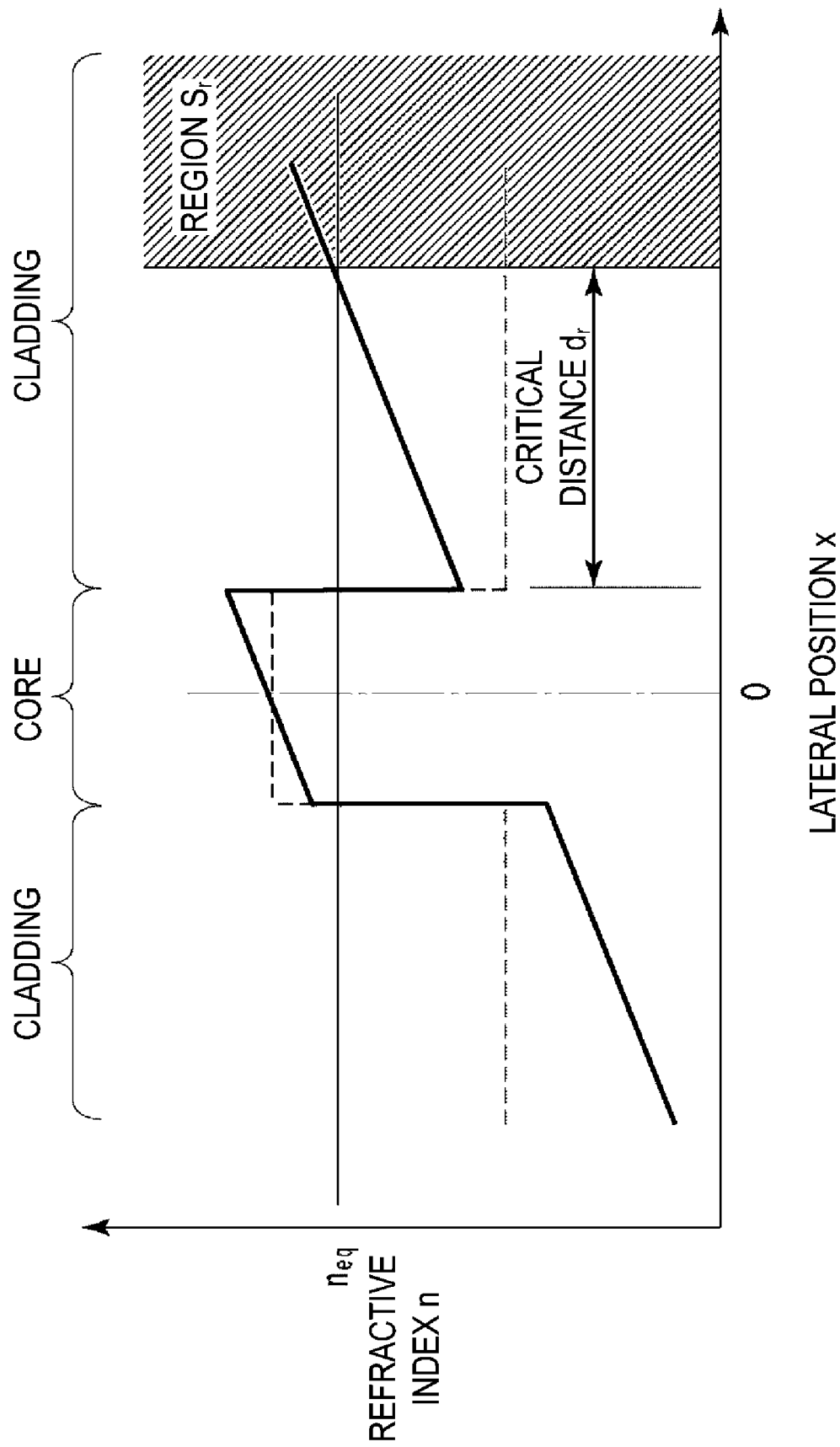
FIG. 1 is a diagram showing an equivalent refractive index distribution of a waveguide bend when the waveguide bend is regarded as a straight waveguide.

FIG. 1 shows an equivalent refractive index distribution of a waveguide bend when the waveguide bend is regarded as a straight waveguide. A solid line indicates the equivalent refractive index distribution in the waveguide bend and a dashed line indicates a refractive index distribution in a normal straight waveguide. Assuming that the curvature radius of the waveguide bend is R, the equivalent refractive index distribution is a distribution obtained by multiplying the refractive index distribution n(x) in the normal straight waveguide by (1+x/R). Here, x is the position in the lateral direction of the waveguide perpendicular to the waveguide direction, with the position of the lateral center (optical axis) of the waveguide set to zero, and the positive direction of x is toward the outside of the curvature and the negative direction is toward the inside of the curvature. The waveguide bend has a refractive index distribution where the refractive index has an overall gradient and increases toward the outside of the curvature. Thus, in a region $S_r$ in the cladding on the outside of the waveguide bend, the region $S_r$, being a region outside a point that is separated from the core of the waveguide by a certain distance (a critical distance $d_r$), the refractive index of the cladding is greater than an equivalent refractive index ($n_{eq}$) experienced by light propagating in a waveguide mode. When the field distribution of light propagating through the core is applied to the region $S_r$, the electromagnetic field thereof radiates outward from the waveguide bend, because it exceeds the propagation velocity determined by the refractive index of the cladding, and results in causing a bend radiation loss. When the curvature radius R of the waveguide bend is small, the gradient of the refractive index distribution is great, such that $d_r$ is small. Therefore, because the amount of power of the field distribution applied to the region $S_r$ increases, the proportion of light radiating increases and the bend radiation loss increases. Thus, in order to suppress the bend radiation loss, it is important to reduce the proportion of the power of the field distribution applied to the region $S_r$ as much as possible, that is, to suppress escape of the field distribution into the region $S_r$. When a relative refractive index difference Δ is given, in order to suppress escape of the field distribution in the lateral direction, the size of the core, particularly the core width, is increased to strengthen light confinement in the lateral direction.

Figure 2:
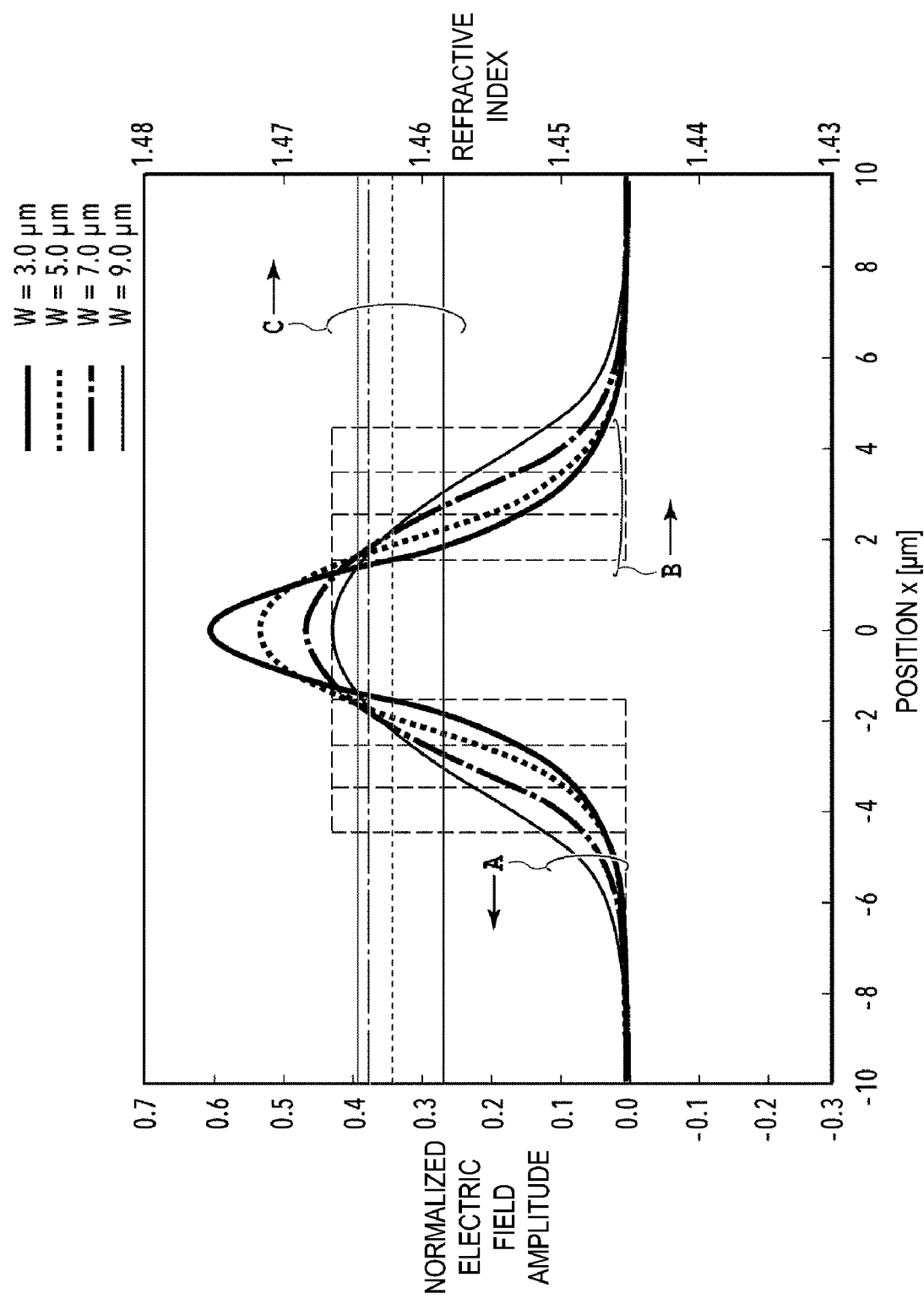
FIG. 2 is a diagram showing field distributions of a fundamental waveguide mode in a straight waveguide.
Figure 3:
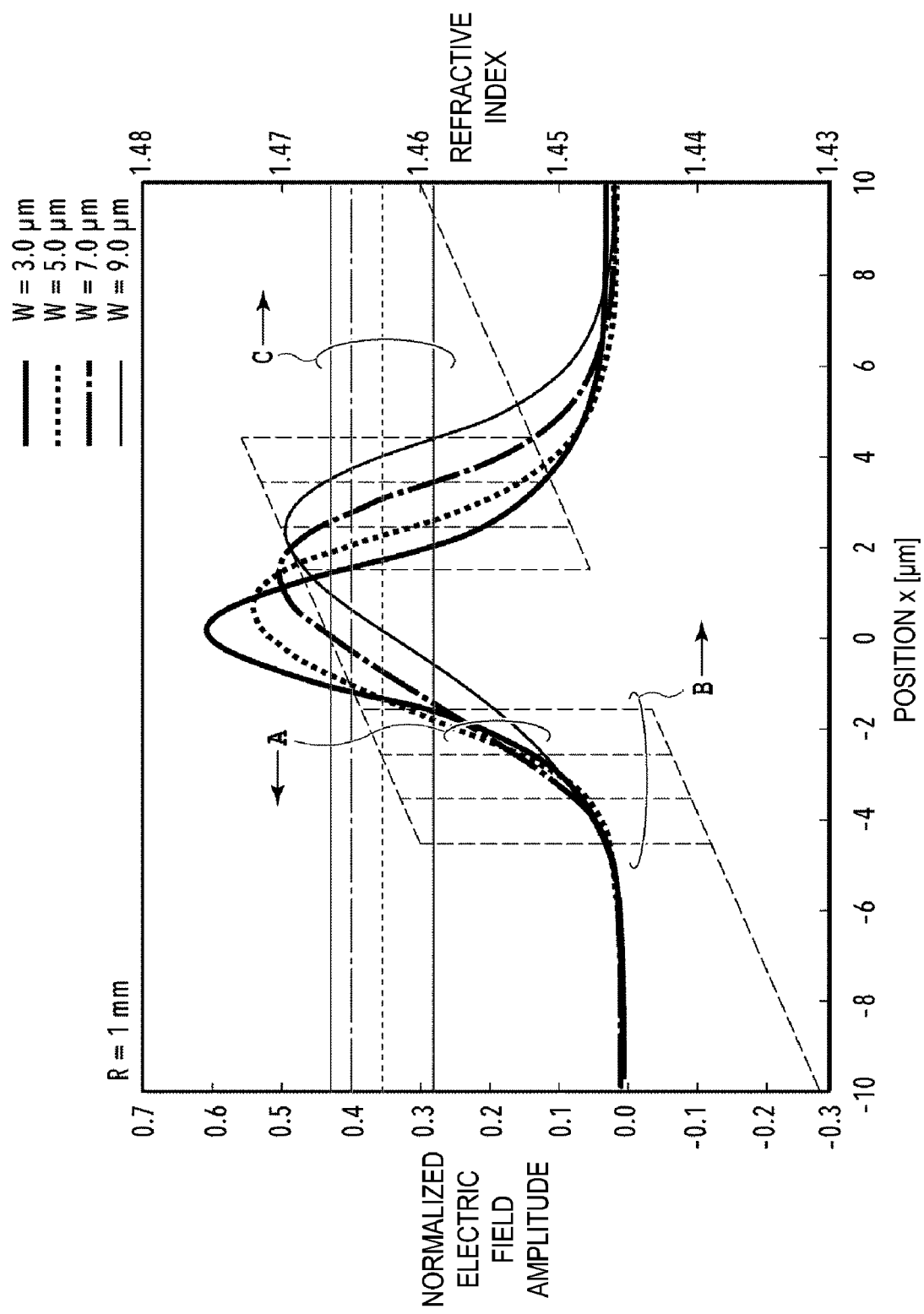
FIG. 3 is a diagram showing field distributions of the fundamental waveguide mode in a waveguide bend.

FIG. 2 shows a result of numerically calculating field distributions of the fundamental waveguide mode in a straight waveguide and FIG. 3 shows a result of numerically calculating field distributions of the fundamental waveguide mode in a waveguide bend having a curvature radius R of 1 mm. Here, the calculation was performed with slab approximation based on an equivalent refractive index method, assuming Silica-based waveguides having a relative refractive index difference Δ of 2%, with the refractive index of a cladding being 1.445, the refractive index of a core being 1.474, and the thickness of the core (core height) being 3.4 μm as an example. The same conditions apply to numerical calculations below unless otherwise specified. In both FIGS. 2 and 3, calculation is performed with four values of the core width W of 3, 5, 7, and 9 μm. A line group A indicates the obtained field distributions of the fundamental waveguide mode and a line group B indicates refractive index distributions of waveguides, each approximated as a slab. A line group C indicates the levels of the equivalent refractive index ($n_{eq}$) calculated back from the propagation constant of the fundamental waveguide mode in the same manner as in FIG. 1. The electric field amplitude of the field distribution is shown normalized by total power.

Figure 4:
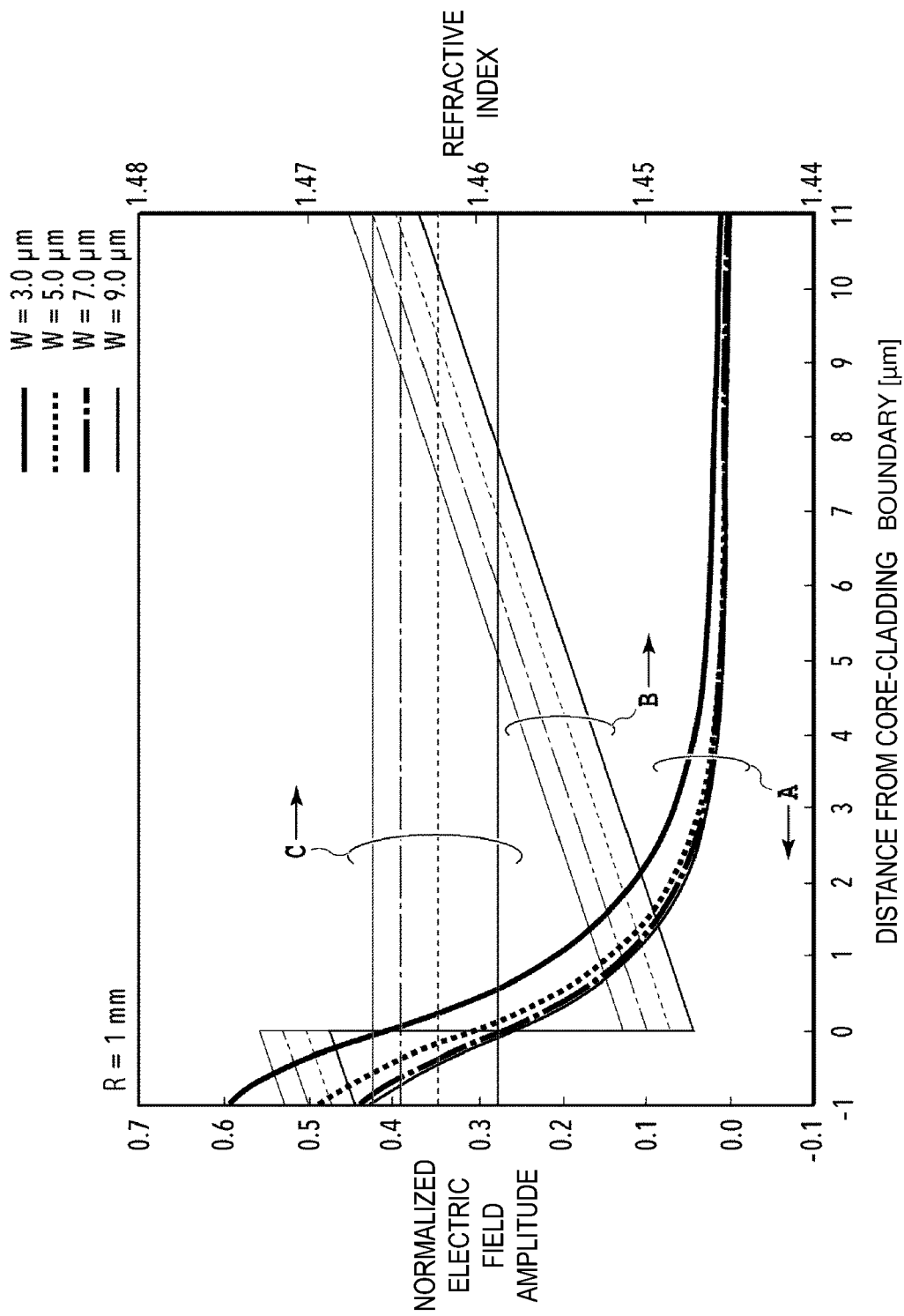
FIG. 4 is a diagram showing details of field distributions of waveguide bends.

FIG. 4 shows details of field distributions of waveguide bends where the position x, which is along the horizontal axis in FIG. 3, is rescaled relative to the position of the boundary between the core and the cladding on the outside of the curvature. In FIG. 4, a critical distances $d_r$ for each waveguide width is the position at which corresponding ones of the dotted and dashed lines intersect each other. From FIG. 4, it can be seen that escape of the field distribution decreases and the critical distance increases as the core width increases. That is, the thicker the core width, the smaller the bend radiation loss.

Figure 5:
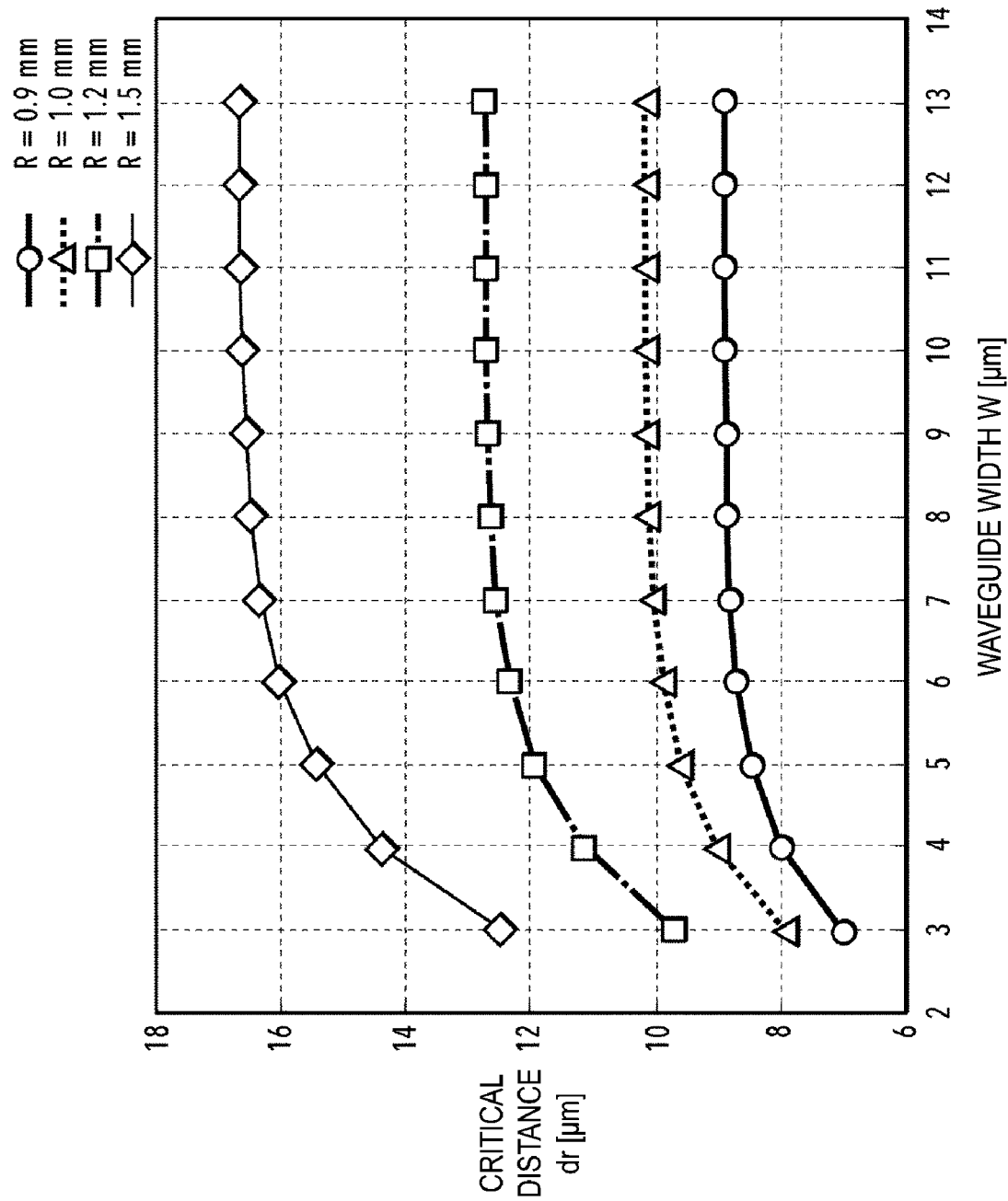
FIG. 5 is a diagram showing the relationship between the waveguide width and the critical distance in a waveguide bend.

FIG. 5 shows the relationship between the critical distance and the waveguide width W when the curvature radius R is 0.9, 1.0, 1.2, and 1.5 mm. It can be seen that, for any curvature radius, the critical distance increases as the waveguide width increases, but the critical distance is substantially an upper limit when the waveguide width is about 8 μm and it is difficult to achieve the effect of further reducing the bend radiation loss by increasing the waveguide width above 8 μm. In general, the larger the waveguide width, higher-order waveguide modes easily occur even in a waveguide bend. When light propagates in a plurality of waveguide modes, in the case where an interferometer is constructed of waveguides, interference of different periods occurs depending on a combination of waveguide modes and interference characteristics deteriorate. Thus, it is not preferable to arbitrarily increase the waveguide width.

From the above, with a refractive index difference of 2% and a core height of 3.4 μm used in this calculation, it can be said that it is desirable that the waveguide width be up to about 8 μm at which the critical distance is substantially an upper limit. When this waveguide width is converted into a normalized propagation constant b, it is about 0.9. Similarly, with other refractive index differences and core heights, the bend radiation loss decreases as the core width increases, but the effect of reducing the bend radiation loss hits a peak with a certain width or larger. Thus, it is desirable to construct waveguide bends with a waveguide width which corresponds to a normalized propagation constant b of about 0.9.

Next, the influence of the waveguide width upon a different-curvature waveguide connection loss will be described. The different-curvature waveguide connection loss is caused by the difference between field distributions of a waveguide bend and a straight waveguide at a connection portion therebetween as described above. As can be seen from the field distributions shown in FIG. 3, the center of the field distribution of each waveguide bend shifts from the center of the waveguide toward the outside of the curvature and the field distribution is laterally asymmetrical. Due to the shift of the center of the field distribution, a straight waveguide and a waveguide bend are connected with the waveguide center position of the waveguide bend at the connection point therebetween shifted to the inside of the curvature (toward the center of curvature of the waveguide bend). That is, the straight waveguide and the waveguide bend are connected such that the optical axis of the waveguide bend at the connection point therebetween is offset to the inside of the curvature from the optical axis of the straight waveguide. Specifically, the amount of shift is determined such that the square of the absolute value of an overlap integral of a normalized electric field distribution of the fundamental propagation mode of the waveguide bend and a normalized electric field distribution of the fundamental propagation mode of the straight waveguide at the connection point between the straight waveguide and the waveguide bend is maximized. Use of such offset connection can reduce the field distribution difference.

Figure 6:
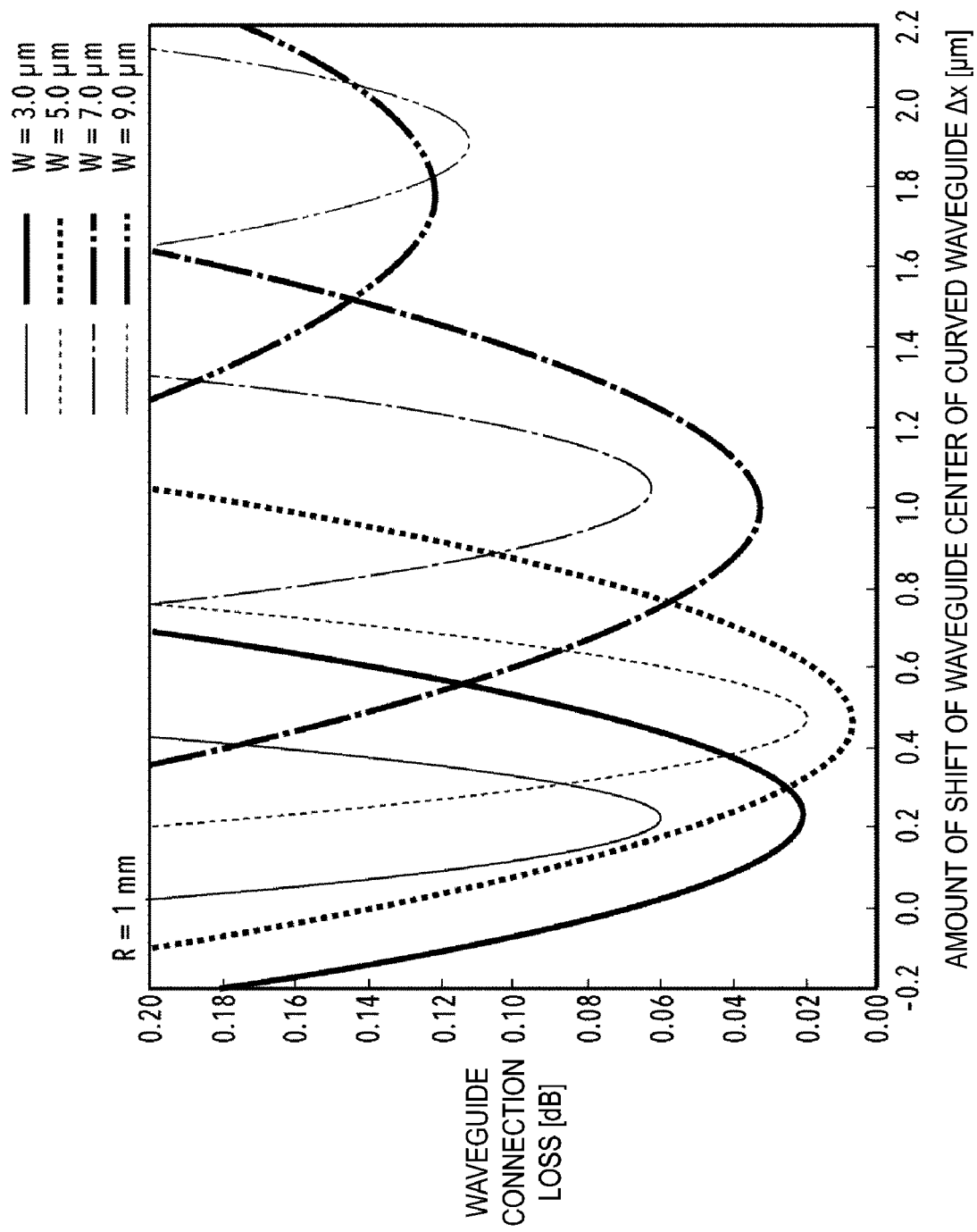
FIG. 6 is a diagram showing the relationship between the amount of shift of a waveguide bend at the waveguide center and the different-curvature waveguide connection loss.

FIG. 6 shows the dependence of the different-curvature waveguide connection loss on the amount of shift. The different-curvature waveguide connection loss in FIG. 6 is obtained from the square of the absolute value of the overlap integral of the field distributions shown in FIGS. 2 and 3 by numerical calculation, and specifically is calculated using field distributions when the waveguide center (optical axis) of the waveguide bend is shifted to the inside of the curvature by the amount of shift Δx. A thick line group indicates waveguide connection losses when a straight waveguide and a waveguide bend are connected and a thin line group indicates waveguide connection losses when a right waveguide bend and a left waveguide bend are connected. In all cases, the curvature radius R of the waveguide bend is 1 mm. Here, the total amount of offset when the right waveguide bend and the left waveguide bend are connected is twice the amount of shift Δx because each of the right waveguide bend and the left waveguide bend is shifted at the waveguide center position. The amount of offset when the straight waveguide and the waveguide bend are connected is the same as the amount of shift Δx. It can be seen that offset connection can make the waveguide connection loss smaller than when no offset is provided (Δx=0). It can be seen that the amount of shift Δx that minimizes the different-curvature waveguide connection loss slightly differs when a straight waveguide and a waveguide bend are connected and when a right waveguide bend and a left waveguide bend are connected, but the difference is small. That is, when waveguides having different curvatures (1/R) are connected, it can be seen that they are connected with the centers of field distributions of the waveguides aligned.

However, as can be seen from the fact that the minimum value of the waveguide connection loss shown in FIG. 6 is not zero, the waveguide connection loss is not zero even if the waveguide bend is connected with the optimal amount of shift. This is because the field distributions remain unmatched due to asymmetry of the field distributions. As can be seen in FIG. 3, the asymmetry of a field distribution obviously increases as the waveguide width increases. On the other hand, even when the waveguide width is very small, the spread of the field distribution over the cladding differs on the left and right, such that the asymmetry is great.

Figure 7:
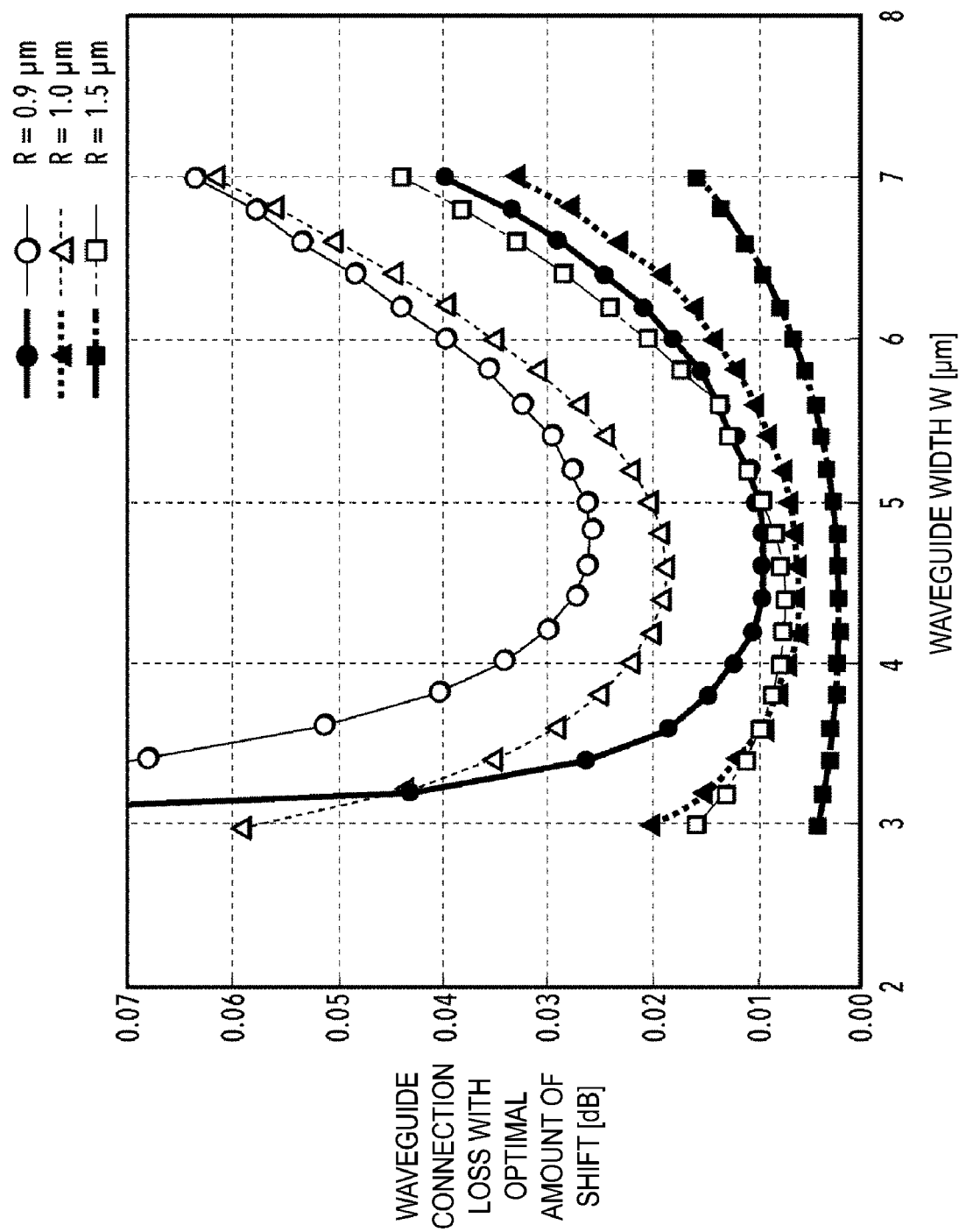
FIG. 7 is a diagram showing the relationship between the waveguide width and the waveguide connection loss with an optimal amount of shift.

FIG. 7 shows the dependence of the waveguide connection loss with an optimal amount of shift on the waveguide width. Numerical calculation results when the curvature radius R is 0.9, 1.0, and 1.5 mm are shown, and solid plot points on each thick line indicate waveguide connection losses when a straight waveguide and a waveguide bend are connected, whereas hollow plot points on each thin line indicate waveguide connection losses when a right waveguide bend and a left waveguide bend are connected. It can be seen that any combination of a curvature radius and a connection has an optimal waveguide width that minimizes the waveguide connection loss. It can be seen that the waveguide connection loss of a waveguide bend having R=1 mm is minimized at a waveguide width of 4 to 5 μm although it differs slightly depending on the curvature radius R. Although not shown in FIG. 7, an optimal waveguide width when a right waveguide bend (with a curvature radius $R_1$) and a left waveguide bend (with a curvature radius $R_2$) having different curvature radii are connected is substantially a mean of an optimal waveguide width when right and left waveguide bends with the curvature radius $R_1$ are connected and an optimal waveguide width when right and left waveguide bends with the curvature radius $R_2$ are connected.

Figure 8:
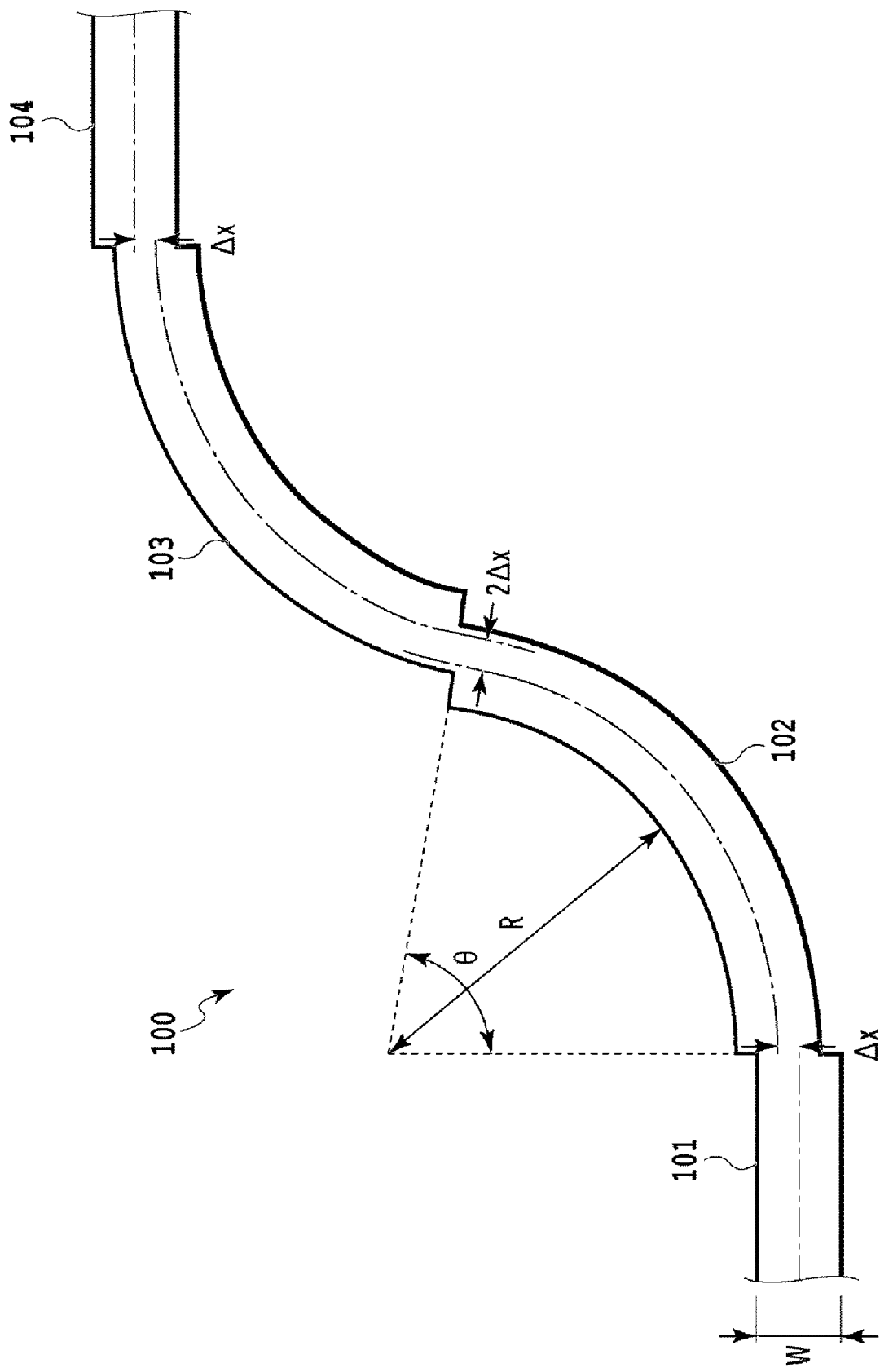
FIG. 8 is a diagram illustrating a configuration of an S-bend waveguide circuit.

To confirm that such numerical calculation studies are correct even with actual waveguides, a test circuit using Silica-based waveguides was manufactured and the circuit excess loss was evaluated with waveguides with various design parameters. FIG. 8 illustrates an S-bend waveguide circuit 100 manufactured as a test circuit. The S-bend waveguide circuit 100 is a circuit including a straight waveguide 101, a left waveguide bend 102, a right waveguide bend 103, and a straight waveguide 104 that are sequentially connected. A circuit including N such S-bend waveguide circuits (where N is 10 or more) that are connected in cascade is used to reduce the measurement error in actual evaluation circuits. As is obvious, the waveguides 101 to 104 are connected at each connection point at the same angle in the waveguide direction. The left waveguide bend 102 is connected to the straight waveguide 101 with the waveguide center position (shown by a dashed line in FIG. 8) of the left waveguide bend 102 shifted to the inside of the curvature by Δx. Similarly, the right waveguide bend 103 is connected to the straight waveguide 104 with the waveguide center position of the right waveguide bend 103 shifted to the inside of the curvature by Δx and the left waveguide bend 102 and the right waveguide bend 103 are connected with each waveguide bend at the connection point therebetween shifted to the inside of the curvature by Δx, such that the left and right waveguide bends 102 and 103 are connected with a total offset of 2 Δx. The waveguide widths of the straight and waveguide bends 101 to 104 are the same width W. A total of 15 types of S-bend waveguide circuits with a curvature radius R of 0.8 mm of the waveguide bends 102 and 103, three bending angles θ of 20, 40, and 60 degrees, and five waveguide widths W of 4, 5, 6, 7, and 8 μm were prepared. A plurality of test circuits were prepared by appropriately changing the amount of shift Δx at the offset portions of each S-bend waveguide circuit. Such a test circuit is manufactured on a silicon substrate using a known combination of a glass film layers deposition technique such as a flame hydrolysis deposition (FHD) method and a microfabrication technique such as reactive ion etching (RIE).

Figure 9:
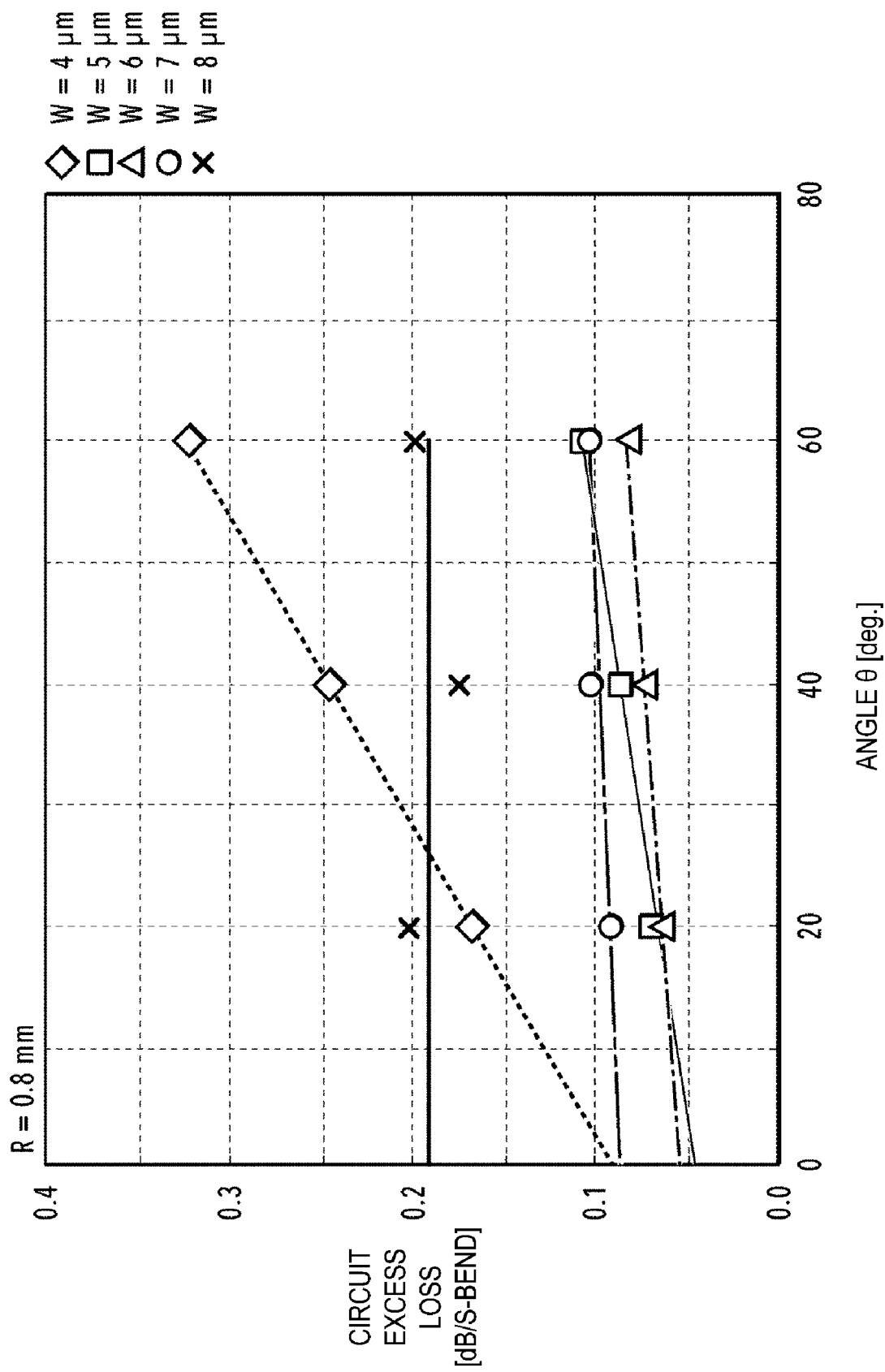
FIG. 9 is a diagram summarizing the results of evaluating the circuit excess loss of the S-bend waveguide circuit.

FIG. 9 shows the results of evaluating the circuit excess loss of S-bend waveguide circuits. FIG. 9 shows the circuit excess loss per S-bend waveguide circuit of the 15 types of test circuits. The characteristics evaluation was performed with average characteristics of 1500 to 1600 nm in the vicinity of the communication wavelength band. Plot lines indicate the loss of test circuits with Δx which minimizes the loss among those of circuits with varying amounts of shift Δx at the offset portions, that is, indicate the circuit excess loss with the optimal amount of shift. In FIG. 9, the horizontal axis represents the bending angle of the waveguide bend. Thus, the gradient of a straight line that is a linear straight line connecting plot points represents a bend radiation loss per degree and the Y-intercept of the straight line represents the waveguide connection loss (which is the sum of the waveguide connection losses at two positions of the straight and waveguide bends and the waveguide connection loss at one position of the right and left waveguide bends), such that the bend radiation loss and the waveguide connection loss can be evaluated separately.

Figure 10:
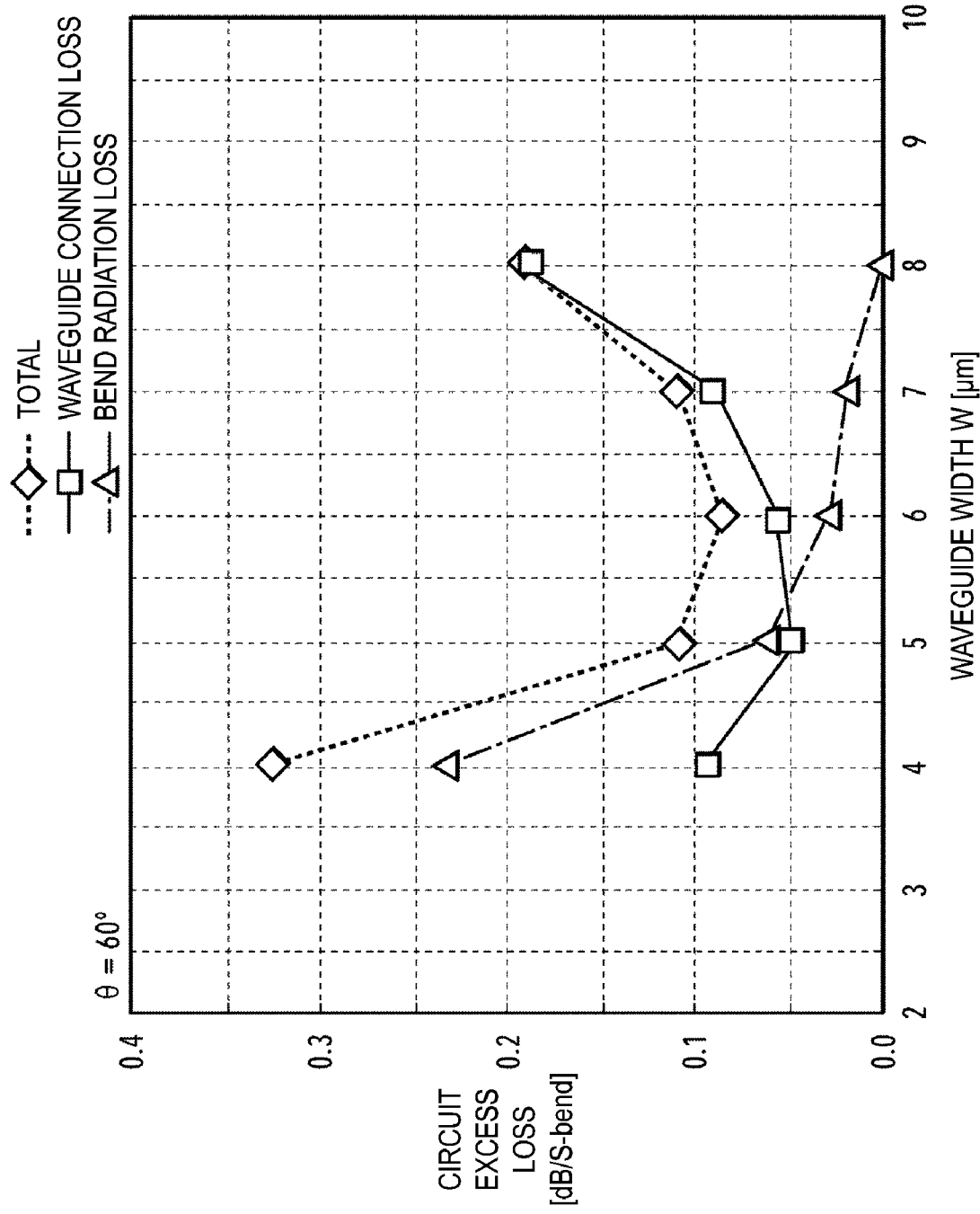
FIG. 10 is a diagram summarizing the values of circuit excess loss of the S-bend waveguide circuit.

FIG. 10 shows the dependence of the circuit excess loss on the waveguide width when the bending angle θ is 60 degrees, together with the values of the circuit excess loss. From FIG. 10, it can be seen that the bend radiation loss decreases as the waveguide width increases and becomes substantially zero when the waveguide width is 7 to 8 μm. When this waveguide width is converted into a normalized propagation constant b, it is about 0.85 to 0.9. It can also be seen that the waveguide connection loss has a minimum value in the vicinity of a little over 5 μm. When this waveguide width is converted into a normalized propagation constant b, it is about 0.8.

It was found that evaluation results of actually manufactured waveguides and numerical calculation results were as follows, although there were some quantitative differences as described above. (1) The bend radiation loss decreases as the core width increases and substantially reaches a lower limit at a certain waveguide width $W_C$. (2) The waveguide connection loss becomes a minimum at a certain waveguide width $W_0$. (3) The waveguide width $W_C$ and the waveguide width $W_0$ are different and $W_C$ is larger than $W_0$ ($W_C$ is substantially 1.5 to 1.8 times $W_0$).

First Embodiment

Taper-Connected Bend Waveguide Circuit

Figure 11:
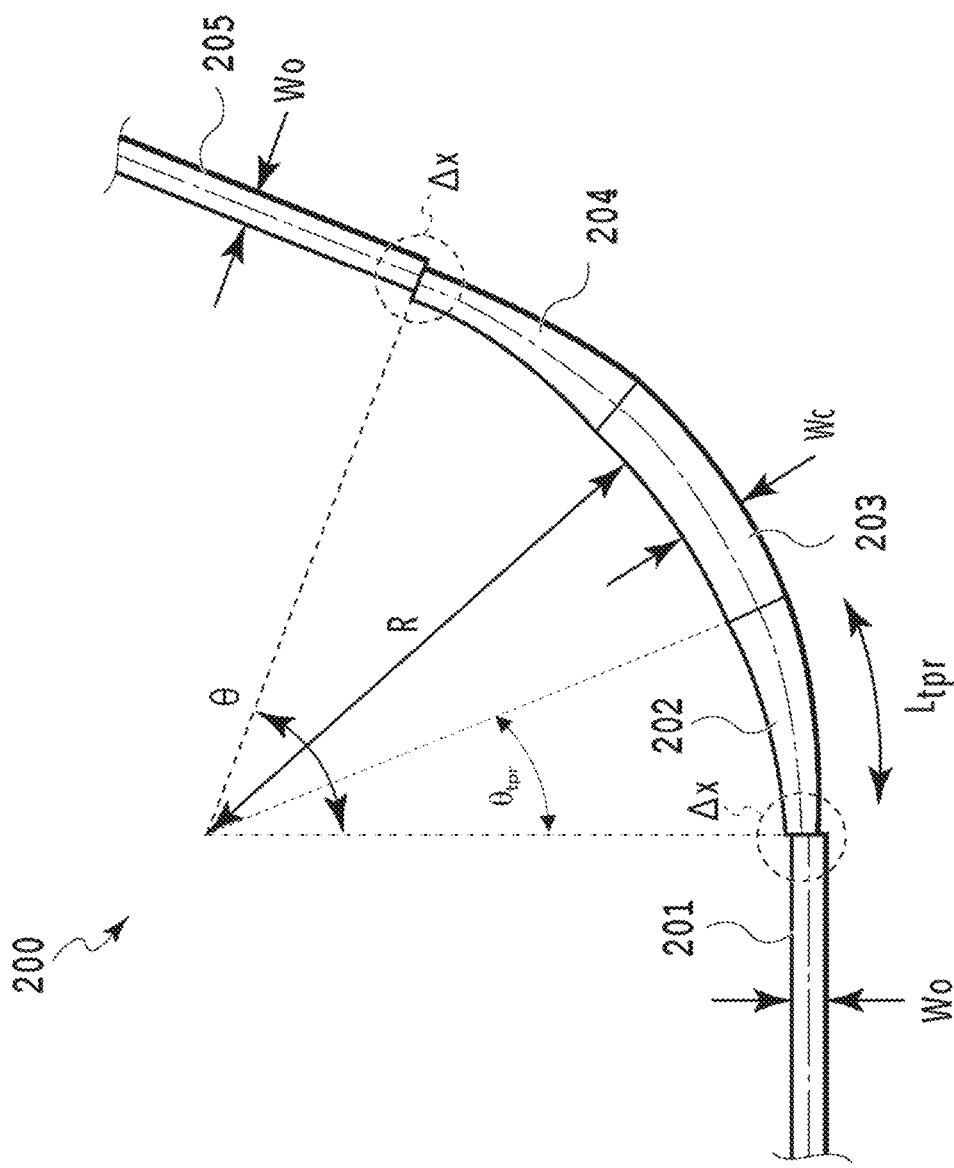
FIG. 11 is a diagram illustrating a configuration of a taper-connected bend waveguide circuit according to a first embodiment of the present invention and FIG. 11B discloses additional aspects of a taper-connected bend waveguide circuit.

FIG. 11 illustrates a configuration of a taper-connected bend waveguide circuit 200 according to a first embodiment of the present invention. The taper-connected bend waveguide circuit 200 is a waveguide circuit including a straight waveguide 201, a tapered waveguide bend 202, a waveguide bend 203, a tapered waveguide bend 204, and a straight waveguide 205 that are sequentially connected. The waveguide widths of the straight waveguides 201 and 205 are constant and Wo at the connection points and the waveguide width of the waveguide bends 203 is $W_C$. The waveguide widths $W_0$ and $W_C$ differ and the magnitude relationship is $W_0 < W_C$. The waveguide width of the tapered waveguide bend 202 is $W_0$ at a portion connected to the straight waveguide 201 and $W_C$ at a portion connected to the waveguide bend 203 and thus the tapered waveguide bend 202 is configured such that the waveguide width gradually increases from $W_0$ to $W_C$. The waveguide width of the tapered waveguide bend 204 is $W_C$ at a portion connected to the waveguide bend 203 and $W_0$ at a portion connected to the straight waveguide 205 and thus the tapered waveguide bend 204 is configured such that the waveguide width gradually decreases from $W_C$ to $W_0$. The curvature radii of the waveguide bend 203 and the tapered waveguide bends 202 and 204 are the same, R. The tapered waveguide bend 202 is connected to the straight waveguide 201 with the waveguide center position of the tapered waveguide bend 202 shifted to the inside of the curvature by Δx and the tapered waveguide bend 204 is connected to the straight waveguide 205 with the waveguide center position of the tapered waveguide bend 204 shifted to the inside of the curvature by Δx. Here, Δx is an optimal amount of shift that minimizes the waveguide connection loss when a straight waveguide and a waveguide bend having a curvature radius of R are connected at the waveguide width $W_0$. The waveguide bend 203 and the tapered waveguide bends 202 and 204 are connected without offset because they have the same curvature radius of R and the same waveguide width of $W_C$ at the connection portions. As is obvious, the waveguides 201 to 205 are connected at each connection point at the same angle in the waveguide direction.

A waveguide width that minimizes the waveguide connection loss when a straight waveguide and a waveguide bend having a curvature radius of R are connected with the optimal amount of shift is selected as the waveguide width $W_0$ of the straight waveguides 201 and 205. That is, a waveguide width that maximizes the square of the absolute value of the overlap integral of a normalized electric field distribution of the fundamental propagation mode of a waveguide bend and a normalized electric field distribution of the fundamental propagation mode of a straight waveguide is selected. A waveguide width at which the bend radiation loss substantially reaches a lower limit is selected as the waveguide width $W_C$ of the waveguide bend 203. The specific value of each waveguide width differs depending on the conditions of the waveguide used (such as the relative refractive index difference Δ, the cladding refractive index, the core refractive index, the core height, and the curvature radius). For example, in the case of the waveguide described above (with relative refractive index difference Δ=about 2%, cladding refractive index=about 1.445, core refractive index=about 1.474, core height=about 3.4 μm, curvature radius=about 1 mm), Wo is set to the waveguide width (4 to 5 μm, or a little over 5 μm) that minimizes the waveguide connection loss in FIG. 7 or 10. In addition, $W_C$ is set to a width at which the critical distance begins to reach an upper limit in FIG. 5 (about 8 μm) or a minimum waveguide width (7 to 8 μm) at which the bend radiation loss does not increase in FIG. 10.

As compared with the configuration of the conventional bend waveguide circuit, the taper-connected bend waveguide circuit 200 of the present embodiment differs in the waveguide width $W_0$ of the straight waveguides 201 and 205 and the waveguide width $W_C$ of the waveguide bend 203 and differs significantly in that the straight waveguides 201 and 205 and the waveguide bend 203 are connected via the tapered waveguide bends 202 and 204 as described above. By giving the freedom to be able to independently optimize the waveguide widths $W_0$ and $W_C$, setting $W_0$ to a waveguide width that minimizes the waveguide connection loss, and setting $W_C$ to a waveguide width that is larger than $W_0$ and suppresses the bend radiation loss, it is possible to realize a low-loss bend waveguide circuit.

Figure 11B:
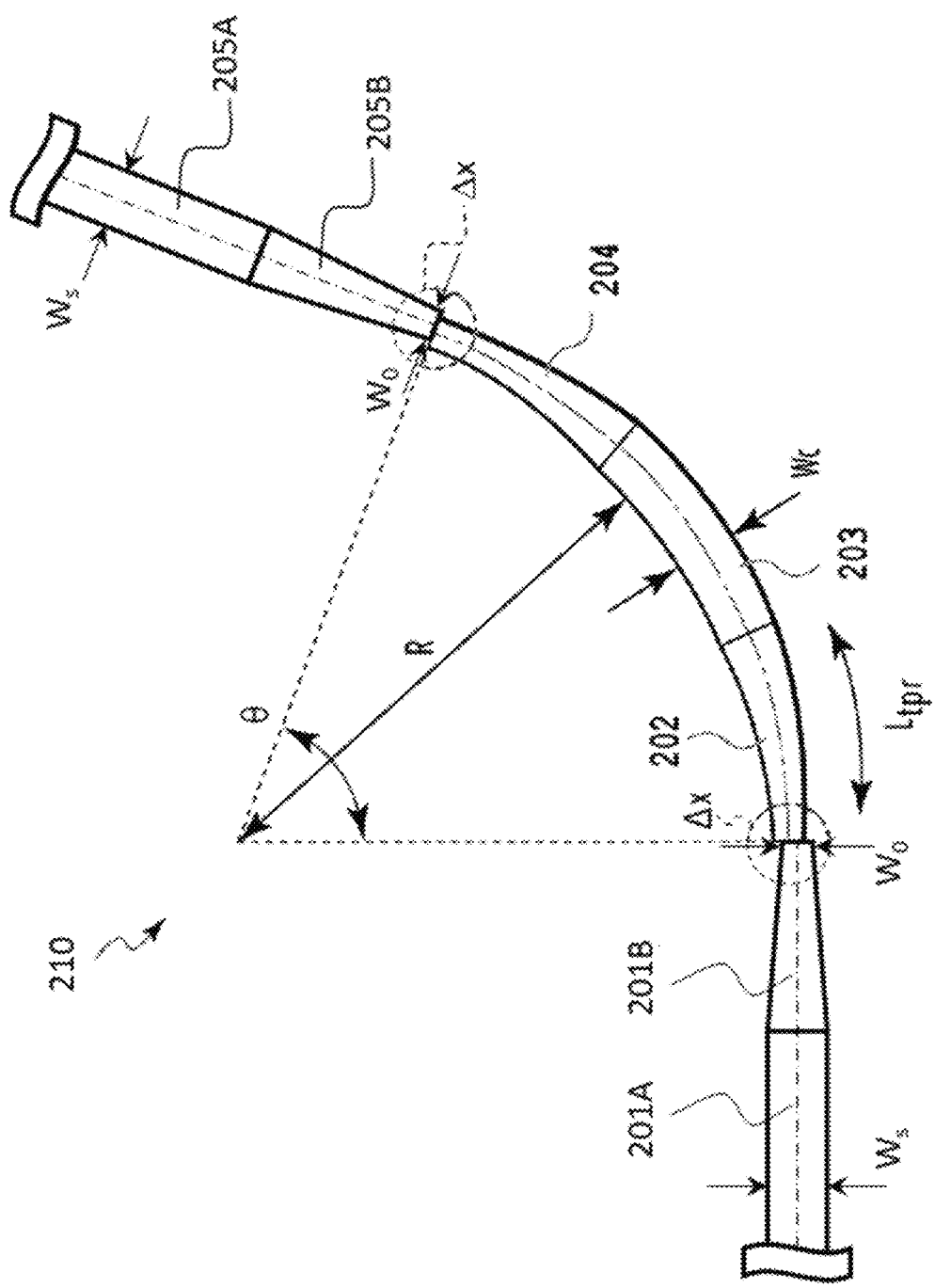

In FIG. 11, the width of the straight waveguide 201 is set to a constant WO, and the straight waveguides 201 and 205 and the tapered waveguide bends 202 and 204 are connected with an offset. What is important in minimizing the waveguide connection loss is that the waveguide widths at the connection points between the straight waveguides and the waveguide bends are set to the optimal waveguide width W0 described above. Thus, as a taper-connected bend waveguide circuit shown in FIG. 11B, when a straight waveguide 201A having a constant width Ws different from the waveguide width W0 is connected to the tapered waveguide bend 202, a straight tapered waveguide 201B whose waveguide width changes from Ws to W0 may be inserted between the straight waveguide 201A and the tapered waveguide bend 202. In this configuration, the waveguide connection loss can be minimized because the waveguide width at the connection portion between the straight tapered waveguide 201B and the tapered waveguide bend 202 having zero curvature is the optimal waveguide width W0. The same applies to the straight waveguide 205. That is, a straight waveguide 205A has a waveguide width $W_s$, and a straight tapered waveguide 205B, having waveguide width changes from $W_s$ to $W_0$, is inserted between the straight waveguide 205A and the tapered waveguide bend 204. The same applies to the subsequent embodiments.

There are several shapes for changing the waveguide widths of the tapered waveguide bends 202 and 204. The simplest shape is a straight tapered shape that changes the waveguide width W in proportion to the coordinate z along the waveguide direction. For example, this shape is represented by $$W(z) = a_s \cdot z + W_0 \quad \text{(Equation 1)}$$

in the case of the tapered waveguide bend 202.

In the case of the tapered waveguide bend 204, the direction of the coordinate z is taken as reversed. Here, $a_s$ is an increment of the waveguide width per unit length. As $a_s$ increases, the waveguide width changes rapidly from $W_0$ to $W_C$ and thus the length $L_{tpr}$ of the tapered waveguide bend 202 in the waveguide direction decreases. However, if $a_s$ is too large, coupling to radiation modes occurs, causing a loss. Further, when the waveguide width is larger than a waveguide width at which higher-order modes exist, coupling to higher-order modes also occurs, causing a loss. On the contrary, as $a_s$ decreases, the loss due to coupling to radiation modes and higher-order modes decreases, whereas $L_{tpr}$ increases. Thus, a value of $a_s$ at which the field distribution of the fundamental waveguide mode changes adiabatically while coupling to radiation modes and higher-order modes is almost negligible, that is, the propagation energy of propagating light stays in the fundamental waveguide mode without being dissipated to other modes such as radiation modes and higher-order modes, is selected.

There is a nonlinear tapered shape whose waveguide width W exponentially changes with respect to the coordinate z along the waveguide direction as a shape better than the straight tapered shape described above. For example, this shape is represented by $$W(z) = (W_0 + b) \cdot e^{a_e z} - b \quad \text{(Equation 2)}$$

in the case of the tapered waveguide bend 202.

In the case of the tapered waveguide bend 204, the direction of the coordinate z is taken as reversed. Here, $a_e$ is the rate of change of the waveguide width per unit length. A value of $a_e$ at which the field distribution of the fundamental waveguide mode changes adiabatically is selected as in the case of tapering of the straight tapered shape. The following is the reason why the nonlinear tapered shape is preferable.

As is well known, the coupling rate of propagating light having field distribution widths $w_1$ and $w_2$ is $2w_1 w_2 / (w_1^2 + w_2^2)$ when the field distributions are approximated by Gaussian distributions. Assuming that the rate of change of one field distribution width with respect to another field distribution width is $c_{\Delta w} = (w_2 - w_1)/w_1$, the coupling loss expressed in decibel is substantially proportional to the 1.5th power of $c_{\Delta w}$. This indicates that the coupling loss of light with different field distributions is smaller when the field distributions are changed in steps than when the field distributions are changed in one step. For example, in the case where light with a field distribution radius $w_1 = 1$ is coupled to light with $w_3 = 2$, the rate of change is $c_{\Delta w} = 1$ and the coupling loss is about 1 dB if they are coupled in one step. The rate of change from $w_1$ to $w_2$ is $c_{\Delta w1} \approx 0.41$, the rate of change from $w_2$ to $w_3$ is also $c_{\Delta w2} \approx 0.41$, and the coupling loss is 0.267 dB + 0.267 dB = 0.534 dB in total if they are coupled in two steps via a field distribution of $w_2 = 2^{1/2}$. Thus, the coupling loss is the smallest when the rate of change of the field distribution width in each step is the same ($c_{\Delta w1} = c_{\Delta w2}$) and is greater than this value when the rate of change in each step differs ($c_{\Delta w1} \neq c_{\neq w2}$). This is the same when multiple steps are involved.

Because in a normal optical waveguide, most optical power is confined in the core and the waveguide width of a region where the optical confinement coefficient is constant at a little less than 1 is often used, it can be considered that the waveguide width W and the field distribution width w of propagating light are substantially in a proportional relationship. Thus, in a tapered waveguide having the nonlinear tapered shape of Equation 2 (here assuming that b=0 for the sake of simplicity of explanation), when the waveguide is divided into minute sections $\Delta z$ along the propagation direction (z direction), the rate of change $c_{\Delta w(i)}$ of the field distribution width in each section i (where i=1 to N) is always constant and equal. Thus, it is possible to effectively shorten the taper length $L_{tpr}$ while suppressing the circuit excess loss due to the change in the waveguide width.

The waveguide width W and the field distribution width w of propagating light are not strictly proportional as described above, and particularly the light confinement coefficient changes significantly when the waveguide width is narrow. Also, the field distribution is not strictly a Gaussian distribution. More precisely, it is desirable to gradually change the waveguide width (generally such that the width changes nonlinearly) such that the rate of change of the field distribution is constant, that is, the coupling rate $\eta_{tpr}$, which is the square of the absolute value of an overlap integral of normalized field distributions of the fundamental waveguide mode before and after propagating through a minute section, is constant in each section. Equation 2 is a simple approximation equation for the change in the waveguide width with which the overlap integral is substantially constant.

As described above, the taper lengths of the tapered waveguide bends 202 and 204 are required to be a constant length $L_{tpr}$ in order to suppress the circuit excess loss due to the change in the waveguide width. Thus, the bending angles of the tapered waveguide bends 202 and 204 are each $\theta_{tpr} = L_{tpr}/R$ [rad]. When the required bending angle $\theta$ of the taper-connected bend waveguide circuit 200 is relatively large such that $\theta > 2\theta_{tpr}$, the bend waveguide circuit is constructed with the configuration illustrated in FIG. 11 as described above. However, when $\theta = 2\theta_{tpr}$, the waveguide bend 203 is omitted and the straight waveguide 201, the tapered waveguide bends 202 and 204, and the straight waveguide 205 are sequentially connected to construct the taper-connected bend waveguide circuit 200. Further, when the bending angle $\theta$ is relatively small such that $\theta < 2\theta_{tpr}$, the waveguide bend 203 is omitted and the taper lengths of the tapered waveguide bends 202 and 204 are set to $L_{tpr} = R \cdot \theta/2$ and the waveguide widths $W_C$ of the tapered waveguide bends 202 and 204 at thicker ends thereof are set to a waveguide width $W_C$ reachable with the taper length $L_{tpr}$.

Second Embodiment

Taper-Connected S-Bend Waveguide Circuit

Figure 12:
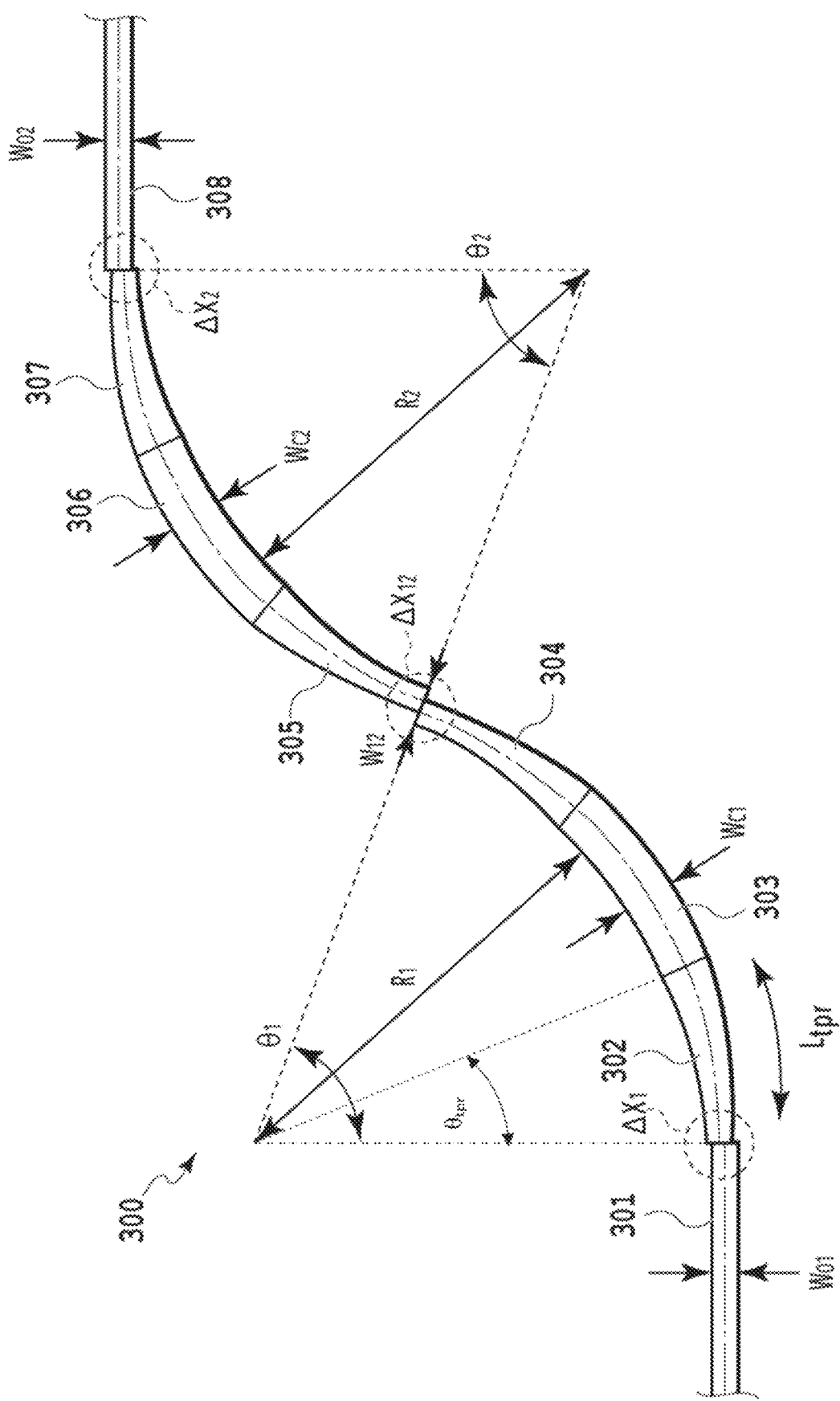
FIG. 12 is a diagram illustrating a configuration of a taper-connected S-bend waveguide circuit according to a second embodiment of the present invention.

FIG. 12 illustrates a configuration of a taper-connected S-bend waveguide circuit 300 according to a second embodiment of the present invention. The taper-connected S-bend waveguide circuit 300 includes a straight waveguide 301, a tapered left waveguide bend 302, a left waveguide bend 303, a tapered left waveguide bend 304, a tapered right waveguide bend 305, a right waveguide bend 306, a tapered right waveguide bend 307, and a straight waveguide 308 that are sequentially connected. The waveguide width of the straight waveguide 301 is $W_{O1}$, the waveguide width of the straight waveguide 308 is $W_{O2}$, the waveguide width of the left waveguide bend 303 is $W_{C1}$, and the waveguide width of the right waveguide bend 306 is $W_{C2}$. The waveguide widths of the straight waveguides and the waveguide bends differ and the magnitude relationship is $W_{O1} = W_{C1}$ and $W_{O2} < W_{C2}$. The waveguide width of the tapered left waveguide bend 302 is $W_{O1}$ at a portion connected to the straight waveguide 301 and $W_{C1}$ at a portion connected to the left waveguide bend 303 and thus the tapered left waveguide bend 302 is configured such that the waveguide width gradually increases from $W_0$ to $W_{C1}$. The waveguide width of the tapered left waveguide bend 304 is $W_{C1}$ at a portion connected to the left waveguide bend 303 and $W_{12}$ at a portion connected to the tapered right waveguide bend 305 and thus the tapered left waveguide bend 304 is configured such that the waveguide width gradually decreases from $W_{C1}$ to $W_{12}$. The waveguide width $W_{12}$ is substantially a mean of $W_{O1}$ and $W_{O2}$ as will be described later. The curvature radii of the left waveguide bend 303 and the tapered left waveguide bends 302 and 304 are the same, $R_1$. The waveguide width of the tapered right waveguide bend 305 is $W_{12}$ at a portion connected to the tapered left waveguide bend 304 and $W_{C2}$ at a portion connected to the right waveguide bend 306 and thus the tapered right waveguide bend 305 is configured such that the waveguide width gradually increases from $W_{12}$ to $W_{C2}$. The waveguide width of the tapered right waveguide bend 307 is $W_{C2}$ at a portion connected to the right waveguide bend 306 and $W_{O2}$ at a portion connected to the straight waveguide 308 and thus the tapered right waveguide bend 306 is configured such that the waveguide width gradually decreases from $W_{C2}$ to $W_{O2}$. The curvature radii of the right waveguide bend 306 and the tapered left waveguide bends 305 and 307 are the same, $R_2$.

The tapered left waveguide bend 302 is connected to the straight waveguide 301 with the waveguide center position of the tapered left waveguide bend 302 shifted to the inside of the curvature by $\Delta x_1$ and the tapered right waveguide bend 307 is connected to the straight waveguide 308 with the waveguide center position of the tapered right waveguide bend 307 shifted to the inside of the curvature by $\Delta x_2$. Here, $\Delta x_1$ is an optimal amount of shift that minimizes the waveguide connection loss when a straight waveguide and a waveguide bend having a curvature radius of $R_1$ are connected at the waveguide width $W_{O1}$ and $\Delta x_2$ is an optimal amount of shift that minimizes the waveguide connection loss when a straight waveguide and a waveguide bend having a curvature radius of $R_2$ are connected at the waveguide width $W_{O2}$.

The tapered left waveguide bend 304 and the tapered right waveguide bend 305 are connected with the waveguide center positions of the two waveguide bends shifted to the inside of the curvature, with an offset of a total of $\Delta x_{12}$, at the connection point between the two waveguide bends. Here, $\Delta x_{12}$ is an optimal amount of shift that minimizes the waveguide connection loss when a waveguide bend having a curvature radius of $R_1$ and a waveguide bend having an opposite curved direction and a curvature radius of $R_2$ are connected at the waveguide width $W_{12}$. That is, the tapered left waveguide bend 304 and the tapered right waveguide bend 305 are connected with their optical axes being offset to the inside of the curvature at the connection point between the two waveguide bends. Specifically, the amount of shift is determined such that the square of the absolute value of an overlap integral of a normalized electric field distribution of the fundamental propagation mode of the tapered left waveguide bend 304 and a normalized electric field distribution of the fundamental propagation mode of the tapered right waveguide bend 305 at the connection point between the two waveguide bends is maximized. $\Delta x_{12}$ is substantially such that $\Delta x_{12} \approx \Delta x_1 + \Delta x_2$ because the waveguides are connected with the centers of field distributions aligned as described with regard to the dependence of the waveguide connection loss on the amount of shift in FIG. 6. The left waveguide bend 303 and the tapered left waveguide bends 302 and 304 are connected without offset because they have the same curvature radius of $R_1$ and the same waveguide width $W_{C1}$ at the connection portions. Similarly, the right waveguide bend 306 and the tapered right waveguide bends 305 and 306 are connected without offset. As is obvious, the waveguides 301 to 308 are connected at each connection point at the same angle in the waveguide direction.

A waveguide width that minimizes the waveguide connection loss when a straight waveguide and a waveguide bend having a curvature radius of $R_1$ are connected with an optimal amount of shift is selected as the waveguide width $W_{O1}$ of the straight waveguide 301 and a waveguide width at which the bend radiation loss of a waveguide bend having a curvature radius of $R_1$ substantially reaches a lower limit is selected as the waveguide width $W_{C1}$ of the waveguide bend 303. A waveguide width that minimizes the waveguide connection loss when a straight waveguide and a waveguide bend having a curvature radius of $R_2$ are connected with an optimal amount of shift is selected as the waveguide width $W_{O2}$ of the straight waveguide 308 and a waveguide width at which the bend radiation loss of a waveguide bend having a curvature radius of $R_2$ substantially reaches a lower limit is selected as the waveguide width $W_{C2}$ of the waveguide bend 306. A waveguide width that minimizes the waveguide connection loss when a waveguide bend having a curvature radius of $R_1$ and a waveguide bend having an opposite curved direction and a curvature radius of $R_2$ are connected with an optimal amount of shift is selected as the waveguide width $W_{12}$ at the connection portion between the tapered left waveguide bend 304 and the tapered right waveguide bend 305. That is, a waveguide width that maximizes the square of the absolute value of an overlap integral of a normalized electric field distribution of the fundamental propagation mode of the tapered left waveguide bend 304 and a normalized electric field distribution of the fundamental propagation mode of the tapered right waveguide bend 305 is selected. $W_{12}$ is substantially such that $W_{12} \approx (W_{O1}+W_{O2})/2$ as described with regard to the dependence of the waveguide connection loss on the waveguide width in FIG. 7.

As compared with the configuration of the conventional S-bend waveguide circuit 100, the taper-connected S-bend waveguide circuit 300 of the present embodiment differs in the waveguide widths $W_{O1}$ and $W_{O2}$ of the straight waveguides 301 and 308 and the waveguide widths $W_{C1}$ and $W_{C2}$ of the left waveguide bend 303 and the right waveguide bend 306 and differs significantly in that $W_{C1}$ and $W_{C2}$ are substantially 1.5 to 1.8 times $W_{O1}$ and $W_{O2}$, the straight waveguide 301 and the left waveguide bend 303 are connected via the tapered left waveguide bend 302, the left waveguide bend 303 and the right waveguide bend 306 are connected via the tapered left waveguide bend 304 and the tapered right waveguide bend 305, substantially at the waveguide width $W_{12}$, and the right waveguide bend 306 and the straight waveguide 308 are connected via the tapered right waveguide bend 307 as described above. By giving the freedom to be able to independently optimize the waveguide widths $W_{O1}$, $W_{O2}$, $W_{12}$, $W_{C1}$, and $W_{C2}$, setting $W_{O1}$, $W_{O2}$, and $W_{12}$ to waveguide widths that minimize the waveguide connection loss, and setting $W_{C1}$ and $W_{C2}$ to waveguide widths that are larger than $W_{O1}$, $W_{O2}$, and $W_{12}$ and suppress the bend radiation loss, it is possible to realize a low-loss S-bend waveguide circuit.

In many S-bend waveguide circuits, $R_1 = R_2$ is often used from the viewpoint of ease of pattern design and equalization and reduction of circuit excess losses. When $R_1 \neq R_2$, the waveguide width $W_{C1}$ of the left waveguide bend 303 and the waveguide width $W_{C2}$ of the right waveguide bend 306 at which the bend radiation loss substantially reaches a lower limit are slightly different and thus it is desirable that their optimal values be individually selected according to the difference (that is, $W_{C1} \neq W_{C2}$). However, because the difference between the optimum $W_{C1}$ and the optimum $W_{C2}$ values is small, the same values may be used from the viewpoint of simplifying the pattern design. Further, $\theta_1 \neq \theta_2$ when the straight waveguide 301 and the straight waveguide 308 are not parallel to each other.

Similar to the first embodiment, a tapered shape represented by Equation 1 or a non-tapered shape represented by Equation 2 can be used for the shapes for changing the waveguide widths of the tapered left waveguide bends 302 and 304 and the tapered right waveguide bends 305 and 306.

Also, similar to the first embodiment, depending on the required bending angles $\theta_1$ and $\theta_2$ of the taper-connected S-bend waveguide circuit 300, the left waveguide bend 303 or the right waveguide bend 306 may be omitted and further the waveguide widths $W_{C1}$ of the tapered left waveguide bends 302 and 304 at thicker ends thereof and the waveguide widths $W_{C2}$ of the tapered right waveguide bends 305 and 307 at thicker ends thereof may each be set to a reachable waveguide width.

Third Embodiment

Taper-Connected W-Bend Waveguide Circuit

Figure 13:
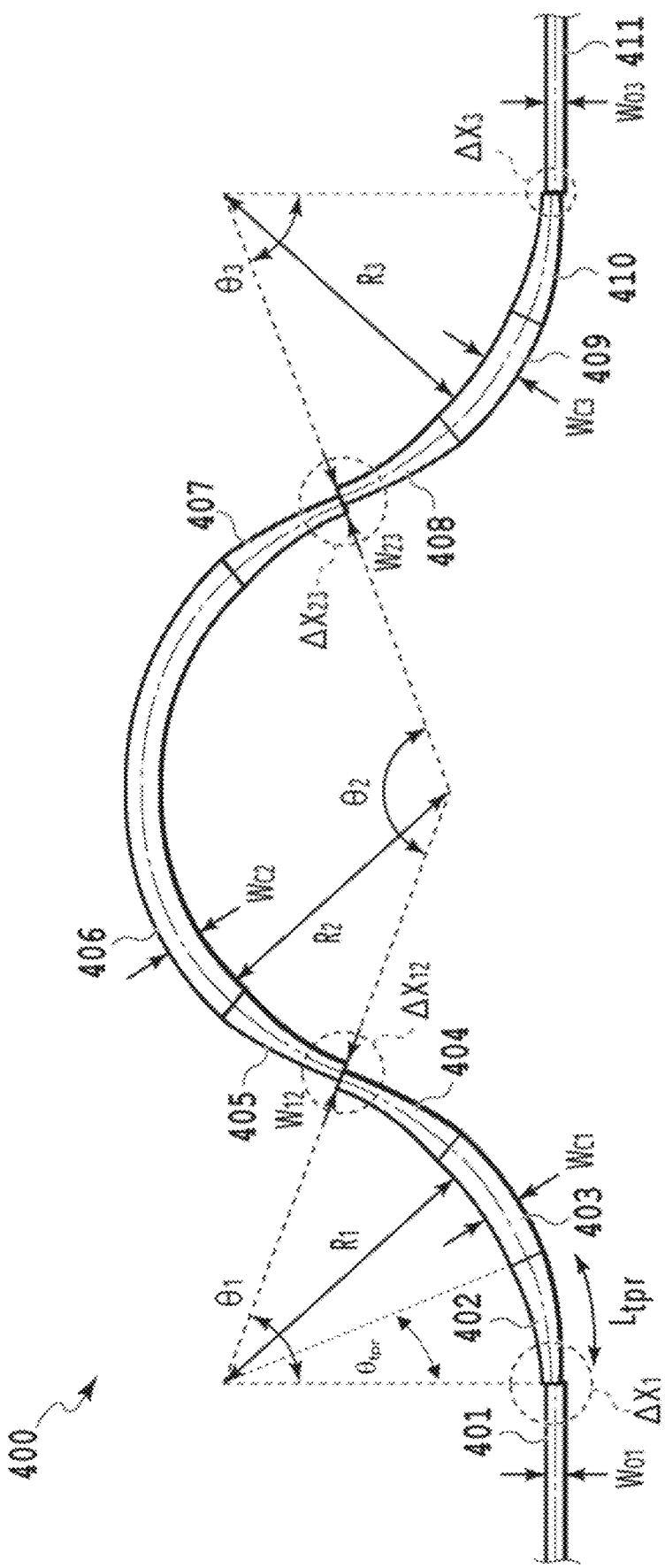
FIG. 13 is a diagram illustrating a configuration of a taper-connected W-bend waveguide circuit according to a third embodiment of the present invention.

FIG. 13 illustrates a configuration of a taper-connected W-bend waveguide circuit 400 according to a third embodiment of the present invention. The taper-connected W-bend waveguide circuit 400 includes a straight waveguide 401, a tapered left waveguide bend 402, a left waveguide bend 403, a tapered left waveguide bend 404, a tapered right waveguide bend 405, a right waveguide bend 406, a tapered right waveguide bend 407, a tapered left waveguide bend 408, a left waveguide bend 409, a tapered left waveguide bend 410, and a straight waveguide 411 that are sequentially connected. This circuit is used as a delay circuit or the like for providing a predetermined optical path length difference. This circuit is configured with the tapered left waveguide bend 408, the left waveguide bend 409, and the tapered left waveguide bend 410 added to the taper-connected S-bend waveguide circuit 300 of the second embodiment. The configuration (such as the tapered shape) of each part, an optimal value for the waveguide width of each part, and an optimal amount of shift at each waveguide connection portion are similar to those of the second embodiment. The waveguides 401 to 411 are similar to those of the second embodiment in that the waveguides 401 to 411 are connected at each connection point at the same connection angles of the waveguides. The reason why the circuit excess loss can be reduced is the same as that of the second embodiment. More specifically, the waveguide width of the left waveguide bend 409 is $W_{c3}$, the waveguide width of the straight waveguide 411 is $W_{O3}$. The magnitude relationship between $W_{c3}$ and $W_{O3}$ is $W_{O3} < W_{c3}$. The waveguide width of the tapered left waveguide bend 408 is $W_{23}$ at a portion connected to the tapered right waveguide bend 407 and $W_{c3}$ at a portion connected to the left waveguide bend 409 and thus the tapered left waveguide bend 408 is configured such that the waveguide width gradually increases from $W_{23}$ to $W_{c3}$. The waveguide width of the tapered left waveguide bend 410 is $W_{c3}$ at a portion connected to the left waveguide bend 409 and $W_{O3}$ at a portion connected to the straight waveguide 411 and thus the tapered left waveguide bend 410 is configured such that the waveguide width gradually decreases from $W_{c3}$ to $W_{O3}$. The curvature radii of the left waveguide bend 409 and the tapered left waveguide bend 408 and 410 are the same, $R_3$. The bending angle from the tapered left waveguide bend 408 to the tapered left waveguide bend 410 is $\theta_3$. In addition, the tapered left waveguide bend 408 is connected to the tapered right waveguide bend 407 by shifting the waveguide center position inside the curvature by $\Delta X_{23}$, and the straight waveguide 411 is connected to the tapered left waveguide bend 410 by shifting the waveguide center position outside by $\Delta X_3$. The amount of the shifting is determined by the same concept as described in Embodiments 1 and 2.

When the tapered left waveguide bend 402, the left waveguide bend 403, and the tapered left waveguide bend 404 are defined as a first waveguide bend group, the tapered right waveguide bend 405, the right waveguide bend 406, and the tapered right waveguide bend 407 are defined as a second waveguide bend group, and the tapered left waveguide bend 408, the left waveguide bend 409, and the tapered left waveguide bend 410 are defined as a third waveguide bend group, the taper-connected bend waveguide circuit 200 of the first embodiment can be said to be a waveguide circuit including the first waveguide bend group and straight waveguides connected to the first waveguide bend group at front and rear ends thereof, the taper-connected S-bend waveguide circuit 300 of the second embodiment can be said to be a waveguide circuit including a waveguide circuit made of the first and second waveguide bend groups connected in series and straight waveguides connected to the waveguide circuit at front and rear ends thereof, and the taper-connected W-bend waveguide circuit 400 of the third embodiment can be said to be a waveguide circuit including a waveguide circuit made of the first to third waveguide bend groups connected in series and straight waveguides connected to the waveguide circuit at front and rear ends thereof. Thus, the idea of the first to third embodiments can also be applied to an N-bend waveguide circuit including a waveguide circuit made of N waveguide bend groups connected in series and straight waveguides connected to the waveguide circuit at front and rear ends thereof, such that the idea can be easily extended to a taper-connected N-bend waveguide circuit of the present invention.

Example

Using the Silica-based waveguide technique, circuits of some of the above embodiments were manufactured and the circuit excess loss was evaluated. These circuits were manufactured on a silicon substrate using a known combination of a glass film layers deposition technique such as a flame hydrolysis deposition (FHD) method and a microfabrication technique such as reactive ion etching (RIE). Waveguides with a relative refractive index difference $\Delta$=about 2% and a core height=about 4 μm were used.

Taper-connected S-bend waveguide circuits 300 (FIG. 12) of the second embodiment were manufactured. The waveguide widths were $W_0=W_{01}=W_{02}=W_{12}=5$ μm. Two types of circuits, circuits with $W_C=W_{C1}=W_{C2}=8.5$ μm and circuits with $W_C=W_{C1}=W_{C2}=10$ μm, were used. The curvature radii were $R_1=R_2=1$ mm and the bending angles were $\theta_1=\theta_2=60$ degrees. The offsets at the connection points were $\Delta x_1=\Delta x_2=\Delta x_{12}/2=0.47$ μm. The shapes for changing the waveguide widths of the tapered left (right) waveguide bends 302, 304, 305, and 306 were obtained using Equation 2. A circuit with $W_{C1}=W_{C2}=5$ μm, that is, a conventional S-bend waveguide circuit 100 (FIG. 8), was also manufactured as a reference.

The evaluation result of the circuit excess loss per S-bend of the manufactured taper-connected S-bend waveguide circuit 300 was 0.026 dB/S-bend when $W_C$=8.5 μm and 0.024 dB/S-bend when $W_C$=10 μm on average of the evaluation wavelengths of 1500 to 1600 nm. On the other hand, the circuit excess loss in the conventional S-bend waveguide circuit 100 was 0.041 dB/S-bend. Thus, by using the configuration of the taper-connected S-bend waveguide circuit 300 of the second embodiment for the S-bend waveguide circuit, it was possible to reduce the circuit excess loss by 0.015 to 0.017 dB per S-bend. This value seems to be slight. However, for example, in a 16×16 matrix switch, because light passes through about 100 S-bend waveguides, the loss reduction amount is 1.5 to 1.7 dB, which is a non-negligible improvement.

By setting $W_0$ to a waveguide width that minimizes the waveguide connection loss and setting $W_C$ to a waveguide width that is larger than $W_0$ and suppresses the bend radiation loss in this way, it was possible to realize a low-loss S-bend waveguide circuit.

The invention claimed is:

1. An optical waveguide having a straight waveguide and a waveguide bend connected to each other, comprising:

a tapered waveguide bend inserted between the straight waveguide and the waveguide bend, a curvature radius of the tapered waveguide bend being equal to a curvature radius of the waveguide bend, a straight tapered waveguide inserted between the straight waveguide and the tapered waveguide bend, wherein:

a waveguide width of the straight tapered waveguide changes continuously from a waveguide width of the straight waveguide to a smaller waveguide width at a connection point between the straight tapered waveguide and the tapered waveguide bend, a waveguide width of the waveguide bend is larger than the waveguide width of the straight tapered waveguide at the connection point between the straight tapered waveguide and the tapered waveguide bend, a waveguide width of the tapered waveguide bend changes continuously from the waveguide width of the waveguide bend to the smaller waveguide width, a waveguide width that maximizes a square of an absolute value of an overlap integral of a normalized electric field distribution of a fundamental propagation mode of the tapered waveguide bend and a normalized electric field distribution of a fundamental propagation mode of the straight tapered waveguide is selected as the smaller waveguide width, and the tapered waveguide bend and the straight tapered waveguide are connected with an optical axis of the tapered waveguide bend and an optical axis of the straight tapered waveguide being offset such that the square of the absolute value of the overlap integral of the normalized electric field distribution of the fundamental propagation mode of the tapered waveguide bend and the normalized electric field distribution of the fundamental propagation mode of the straight tapered waveguide at the connection point between the straight tapered waveguide and the tapered waveguide bend is maximized.

2. The optical waveguide according to claim 1, wherein th waveguide width of the waveguide bend is 1.5 to 1.8 times the waveguide width of the straigh tapered waveguide at the connection point between the straight tapered waveguide and the tapered waveguide bend.

3. The optical waveguide according to claim 1, wherein the waveguide width of the tapered waveguide bend changes such that a square of an absolute value of an overlap integral of normalized field distributions of the fundamental waveguide mode before and after propagating through a minute section in the tapered waveguide bend is constant.

4. The optical waveguide according to claim 1, wherein the waveguide width of the tapered waveguide bend is W and W changes with respect to a coordinate z along a waveguide direction of the tapered waveguide bend according to $$W(z)=(W_0+b)\cdot e^{a_e z}-b,$$

where $W_0$ is the waveguide width at z=0 and $a_e$ and b are constants and $W_0$ is the smaller waveguide width.

5. An optical waveguide comprising:
a first waveguide bend;
a second waveguide bend having a curvature in a direction opposite to that of the first waveguide bend; and
a first tapered waveguide bend and a second tapered waveguide bend inserted between the first waveguide bend and the second waveguide bend, wherein a curvature radius and a bending direction of the first tapered waveguide bend are equal to a curvature radius and a bending direction of the first waveguide bend, a waveguide width of the first tapered waveguide bend changing continuously from a waveguide width of the first waveguide bend to a smaller waveguide width than the waveguide width of the first waveguide bend, a curvature radius and a bending direction of the second tapered waveguide bend are equal to a curvature radius and a bending direction of the second waveguide bend, a waveguide width of the second tapered waveguide bend changing continuously from the smaller waveguide width to a waveguide width of the second waveguide bend, the first tapered waveguide bend and the second tapered waveguide bend are connected with an optical axis of the first tapered waveguide bend and an optical axis of the second tapered waveguide bend being offset such that a square of an absolute value of an overlap integral of a normalized electric field distribution of a fundamental propagation mode of the first tapered waveguide bend and a normalized electric field distribution of the fundamental propagation mode of the second tapered waveguide bend at a connection point between the first tapered waveguide bend and the second tapered waveguide bend is maximized, and a waveguide width that maximizes the square of the absolute value of the overlap integral of the normalized electric field distribution of the fundamental propagation mode of the first tapered waveguide bend and the normalized electric field distribution of the fundamental propagation mode of the second tapered waveguide bend is selected as the smaller waveguide width.

6. The optical waveguide according to claim 5, wherein the waveguide width of the first waveguide bend and the waveguide width of the second waveguide bend are 1.5 to 1.8 times the smaller waveguide width.

7. The optical waveguide according to claim 5, wherein the waveguide widths of the first and second tapered waveguide bends change such that a square of an absolute value of an overlap integral of normalized field distributions of the fundamental waveguide mode before and after propagating through a minute section in each of the first tapered waveguide bend and the second tapered waveguide bend is constant.

8. The optical waveguide according to claim 5, wherein the waveguide width of each of the first tapered waveguide bend and the second tapered waveguide bend is W and W changes with respect to a coordinate z along a waveguide direction of a corresponding one of the first tapered waveguide bend and the second tapered waveguide bend according to $$W(z)=(W_0+b)\cdot e^{a_e z}-b,$$

where $W_0$ is the waveguide width at z=0 and a and b are constants and $W_0$ is the smaller waveguide width.

* * * * *